Jan. 13, 1970  J. L. HARRIS  3,489,015
CONTROL DEVICE
Filed May 1, 1967  8 Sheets-Sheet 1

Inventor
John L. Harris

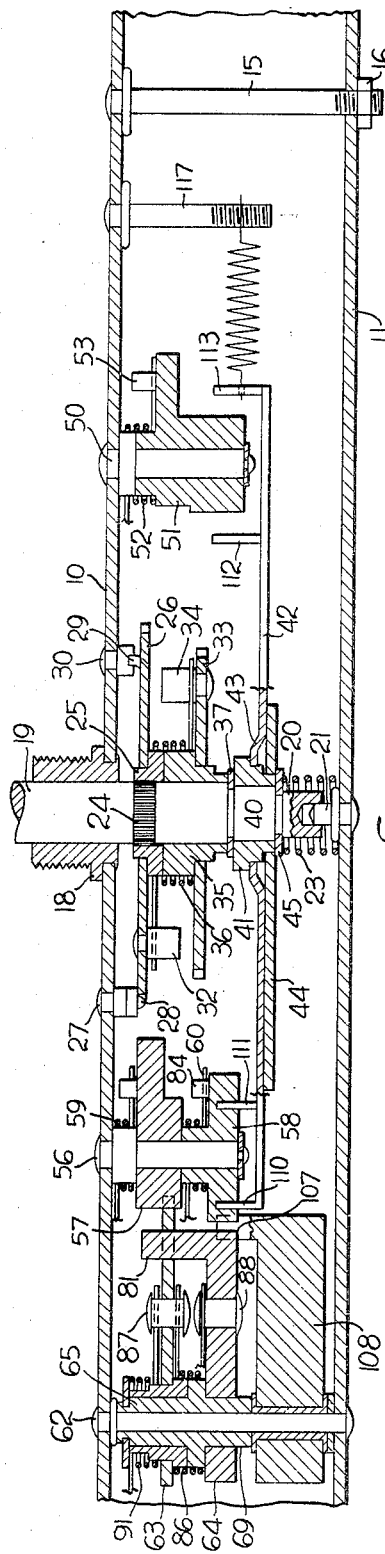

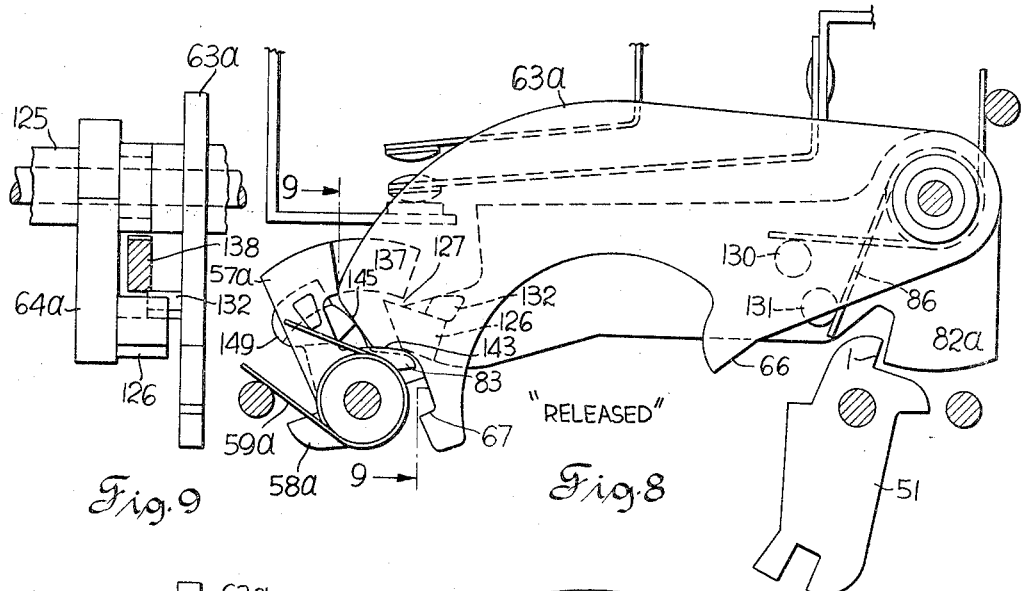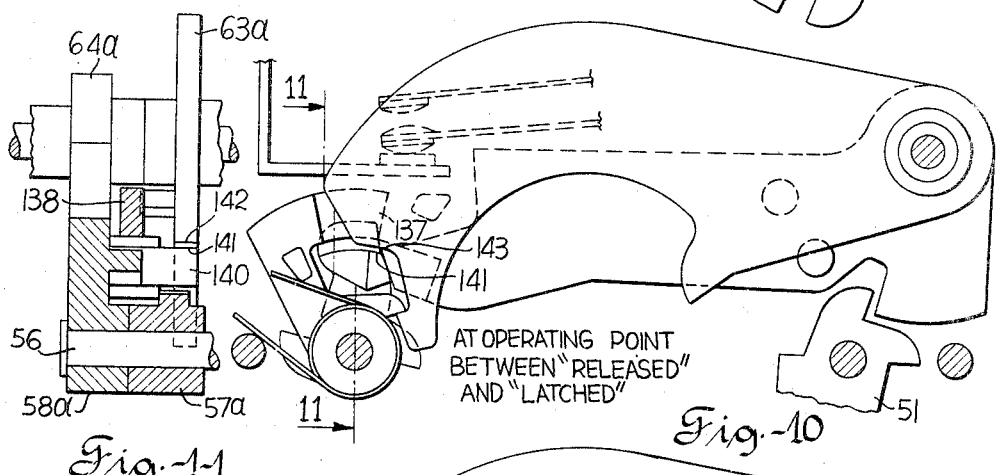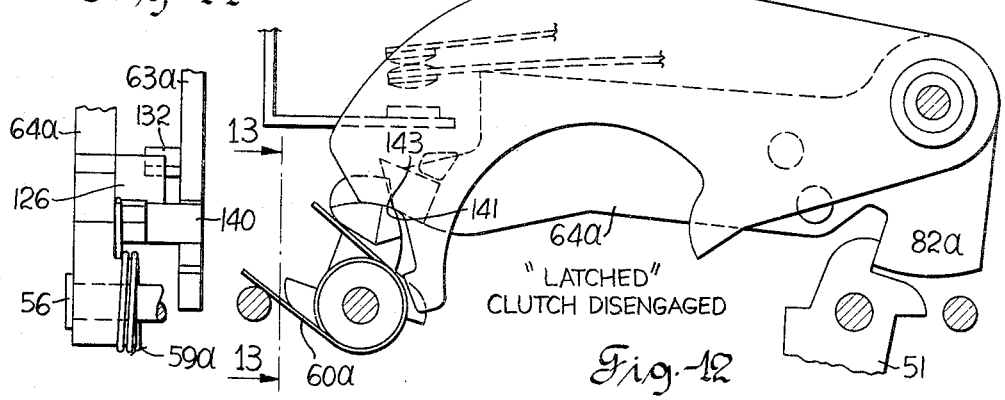

SOLENOID ENERGIZED
OR PUSHBUTTON DEPRESSED
LATCH #2 DISENGAGED

SOLENOID ENERGIZED
AND/OR PUSHBUTTON STILL DEPRESSED
LATCH RE-ENGAGED

Inventor
John L. Harris

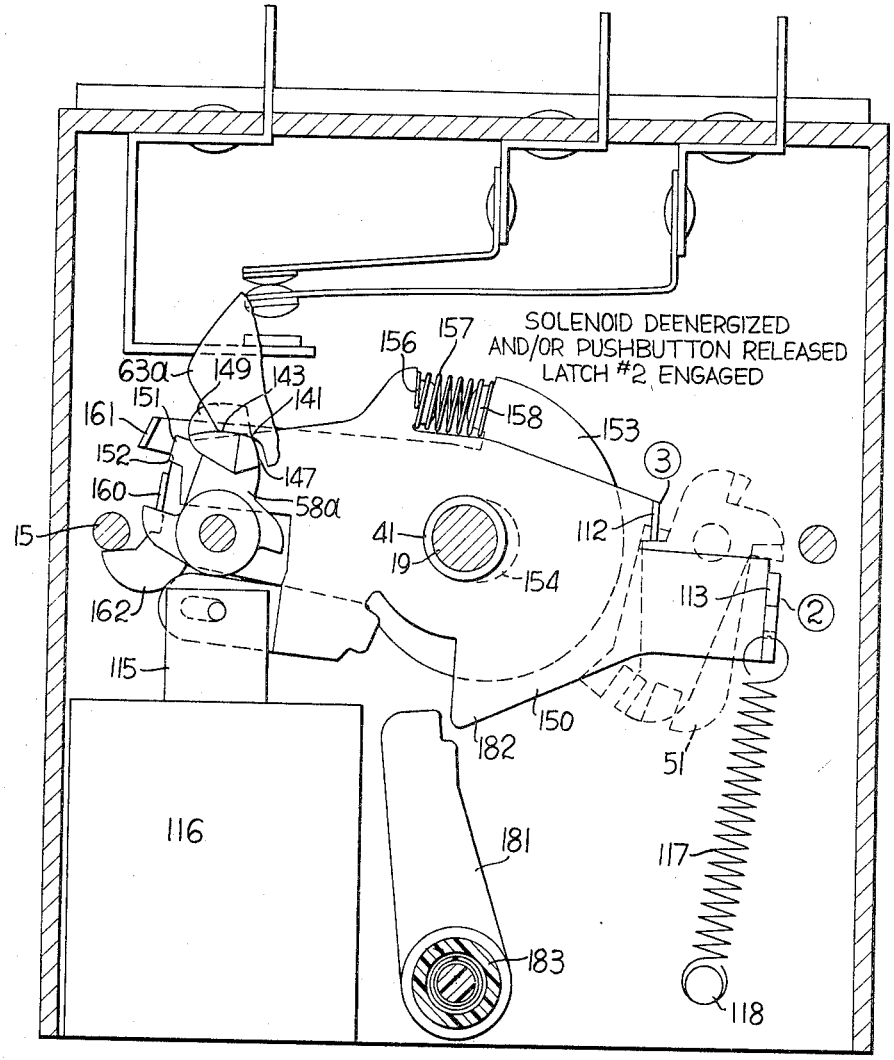
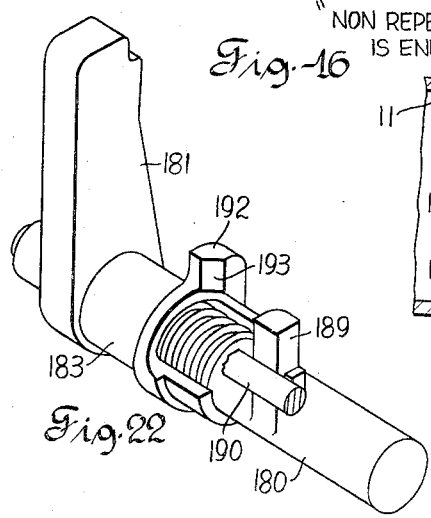
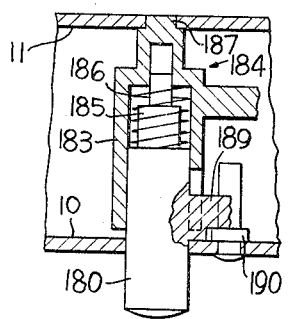
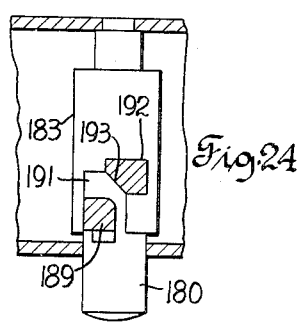

Jan. 13, 1970     J. L. HARRIS     3,489,015
CONTROL DEVICE

Filed May 1, 1967     8 Sheets-Sheet 6

SOLENOID ENERGIZED
AND/OR PUSHBUTTON DEPRESSED
LATCH #2 ENGAGED

SOLENOID DEENERGIZED
AND PUSHBUTTON RELEASED
LATCH #2 DISENGAGED

SOLENOID DEENERGIZED
AND PUSHBUTTON RELEASED
LATCH #2 ENGAGED

"NON REPEAT"
RELEASE LATCH #2 WHEN SOLENOID IS DEENERGIZED
AFTER BEING ENERGIZED

Inventor
John L. Harris

Jan. 13, 1970      J. L. HARRIS      3,489,015

CONTROL DEVICE

Filed May 1, 1967      8 Sheets-Sheet 7

Inventor
John L. Harris

Jan. 13, 1970   J. L. HARRIS   3,489,015
CONTROL DEVICE

Filed May 1, 1967   8 Sheets-Sheet 8

Inventor
John L. Harris

United States Patent Office 3,489,015
Patented Jan. 13, 1970

3,489,015
CONTROL DEVICE
John L. Harris, Waukesha, Wis., assignor to Deltrol
Controls Corp., Milwaukee, Wis.
Filed May 1, 1967, Ser. No. 635,185
Int. Cl. F16h 5/76; H01h 43/10
U.S. Cl. 74—3.5                                      41 Claims

ABSTRACT OF THE DISCLOSURE

An automatic reset timer in which a basic mechanism responds in a wide variety of manners to external control actions. The reset clutch is released by one or more of four control options. Transfer of the switch for timing may be done by one or more of seven control options. Selection of both clutch and switch options is done by installing a "key" mechanical subassembly at final assembly. The various options are obtained by simple mechanical actions and require no switches or control circuitry.

---

This invention relates in general to automatic controls and more particularly to timers of the automatic reset type.

One object of the invention is to provide a mechanism of this general type which is simple and compact in construction, reliable and accurate in operation, and low in cost to produce. Another object of the invention is to provide a basic mechanism which can be produced in a wide variety of types or characteristics by the provision of key parts or sub-assemblies which determine how the timer responds to external control actions.

Other objects will appear from the following description and the appended claims.

For a full disclosure of the invention, reference is made to the following detailed description and to the accompanying drawings in which:

FIGURE 5 is a stretched out sectional view showing the mountings of and the relationship of the various components;

FIGURE 6 is a sectional view of the timer gear train and clutch mechanism;

FIGURE 7 is a perspective view of the complete timer;

FIGURE 8 is an enlarged fragmentary view of a modified arrangement of operator and latch mechanism showing the switch operator in the "released" position;

FIGURE 9 is a view taken on line 9—9 of FIGURE 8;

FIGURE 10 is a view similar to FIGURE 9 but showing the parts in the positions assumed just before the switch mechanism operates;

FIGURE 11 is a sectional view taken on line 11—11 of FIGURE 10;

FIGURE 12 is a fragmentary view of the switch operating mechanism in the "latched" position;

FIGURE 13 is a view taken on line 13—13 of FIGURE 12;

FIGURE 16 is an enlarged sectional elevation showing one for of "nonrepeat" solenoid lever mechanism;

FIGURE 22 is a broken away perspective of the push button mechanism;

FIGURE 23 is a sectional view of the push button lever and push button;

FIGURE 24 is a view taken at right angles to FIGURE 23 showing the camming action of the push button plunger on the push button lever;

Figure 1:
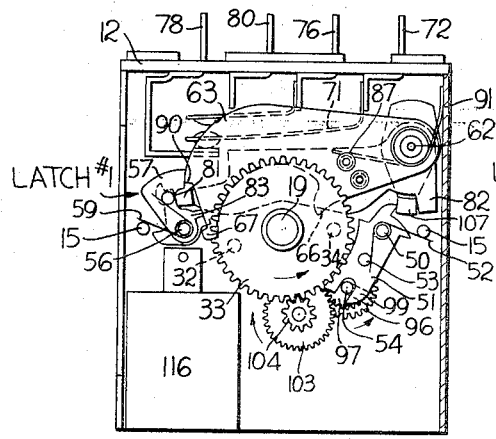
FIGURE 1 is a broken away front elevation showing the switch and operating mechanism in the positions assumed during a timing cycle.

FIGURES 27 to 37 inclusive are schematic wiring diagrams showing different applications of various models provided by the invention.

The timer mechanism is preferably supported in an enclosure of the type shown in FIGURE 7. This enclosure includes an L-shaped front and side member 10 which interfits with an L-shaped rear and left side member 11. These members support the phenalic switch panel 12. This panel supports the switching mechanism and also forms the top of the enclosure. The rear member 11 also supports an auxiliary terminal panel 13 carrying additional terminals for external wiring of the timer. The rear plate 11 also supports the timer motor 14. The front and rear sections of the timer are held together by studs such as 15 (FIG. 5) mounted on the front of member 10 and extending through the rear member 11, and being provided with nuts such as 16.

The front section of the housing is provided with a hollow threaded bearing member 18 for mounting the timer to a panel. A main or adjusting shaft 19 extends through the bearing 18 to a point adjacent but spaced from the rear housing member 11.

The rear end of this shaft is reduced as at 20 and is drilled to receive a stud 21 secured to the back 11 of the case. A spring 23 surrounds the reduced portion 20 of the shaft and urges the shaft forwardly.

The shaft 19 is provided with a knurl 24 over which is pressed a bushing 25 carrying a setting gear 26. This setting gear is held in adjusted position by means of a stud 27 which is mounted on the case front 10 and which has a reduced portion 28 which extends between teeth of the setting gear 26. It will be apparent that the spring 23 urges the shaft and setting gear forwardly thus urging the setting gear into contact with the projection 28. In order to adjust the angular position of the setting gear 26, the user pushes the setting knob 30 (FIGURE 7) in. This pushes the shaft in against the action of the spring 23 allowing the setting gear 26 to disengage from the projection 27. The shaft is now free to be turned to the desired adjusted position. When the knob is released, the spring 23 forces the shaft forwardly for bringing the setting gear 26 back into contact with the projection 28 thus holding it in the new adjusted position. Rotation of the shaft 19 is preferably limited by means of a projection 29 which is struck forwardly out of the setting gear 26. This projection engages with a stop pin 30 anchored on the case front 10. The projection 29 and stop pin 30 are proportioned so that the projection 29 cannot pass over the stop 30 when the shaft is pushed in for setting.

The setting gear 26 carries a reset stop pin 32 which extends to the rear of gear 26. Freely mounted on the main shaft 19 is a timing gear 33 having a stud 34 which extends forwardly at approximately the same radial distance from the shaft center as the reset stop 32. The timing gear 33 is supported on a bearing 35 which is free to rotate on the shaft 19. A torsion-type reset spring 36 fits over the bearing 35 and the setting gear bushing 25. One end of this spring engages the reset stop 32 and the other end of the spring engages the operating stud 34. The shaft 19 is preferably grooved and provided with a retainer 37 which holds the timing gear assembly in place.

Freely mounted on a reduced portion 40 of shaft 19 is a solenoid lever bearing 41 which carries the solenoid lever 42. This solenoid lever is dimpled as at 43 to make room for a secondary lever 44. Such secondary levers are described later in this description. This solenoid lever bearing is held in place by a retainer 45 which fits into a groove provided in the shaft. With the arrangement shown, the retainer 45 will hold the solenoid lever in place whether or not the secondary lever 44 is used in the particular timer.

Figure 2:
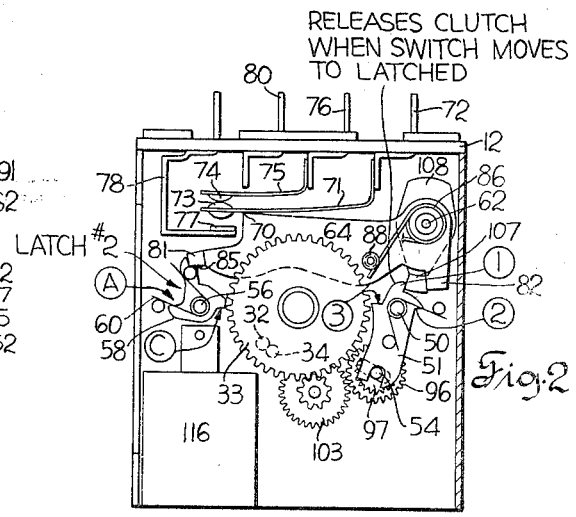
FIGURE 2 is a view similar to FIGURE 1 but showing the switch and operating parts in the "timed out" positions.

To the right of main shaft 19 as seen FIGURES 1 and 5 is mounted a stud 50 which supports a clutch operator 51. This clutch operator is biased in a counterclockwise direction as seen in FIGURE 1 by means of a spring 52. This spring is of the torsion-type, one leg bearing on the case stud 15 and the other leg bearing on a pin 53 which is molded integral with the clutch operator 51. As seen in FIGURE 1 the lower end of the clutch operator is bifurcated, receiving the clutch gear shaft 54. It will be noted the bifurcated portion of the clutch operator is adjacent the case front 10. The clutch operator itself however extends rearwardly adjacent the solenoid lever 42 as seen in FIGURE 5. This rearwardly extending portion of the clutch operator is provided with separate and distinct operating surfaces 1, 2, and 3 as shown in FIGURE 2. Operating surface 1, as seen in FIGURE 2, is a substantially vertical surface located above the pivot 50. Operating surface 2 is a surface extending to the right of the pivot 50, and operating surface 3 is a surface extending to the left of the pivot 50. It will be apparent that pressure on any of the operating surfaces 1, 2 or 3 will cause counterclockwise rotation of the clutch operator 51 about the pivot 50 against the bias of the spring 52. The purpose of this arrangement will become apparent as this description proceeds.

Located to the left of the shaft 19 as seen in FIGURES 1 and 5 is a latch stud 56. This stud is mounted in the front plate 10 and extends rearwardly, supporting latch 57 (latch #1) and latch 58 (latch #2). Latch 57 is biased in a clockwise direction by means of spring 59 of the torsion-type, one leg bearing on stud 15 and the other leg bearing on a molded pin on latch 57. Latch 58 is similarly biased by means of a spring 60. Both latches are thus biased in a clockwise direction as seen in FIGURE 1.

Also mounted on the case front 10 is a stud 62 which supports spring lever 63 and switch operator 64. The spring lever 63 is mounted on a bearing 65 which in turn is freely mounted on the stud 62. This spring lever extends to the left across the timer as seen in FIGURE 1 and is provided with two operating surfaces. The surface 66 is located in the path of the operating pin 34 on the timing gear 33. The second operating surface of the spring lever is surface 67 located at the lower left end of the operating lever. These operating surfaces are more clearly shown in the enlarged view FIGURE 8. The operating surface 67 serves to operate the latch 57 (latch #1) which will be explained as this description proceeds.

The switch operator 64 is carried on a bearing 69 which fits over the shaft 62 and supports the bearing 65 of the spring lever. As shown in FIGURE 2, the switch operator 64 extends to the left across the timer and is formed with an edge 70 which contacts a switch blade 71 carried by a bracket 72 mounted on the switch panel 12. This switch blade 71 is provided with a double contact 73, the upper side of which may engage a contact 74 on switch blade 75 carried by contact bracket 76 mounted on the terminal panel. The lower part of contact 73 is adapted to engage a stationary contact 77 carried by contact bracket 78 also mounted on panel 12. This panel 12 also carries an additional terminal 80 to provide an internal connection for the timer solenoid described later.

The switch operator 64 extends around the contact bracket 78 and at its end is provided with a laterally extending latching section 81. As shown in FIGURE 5, this latching section extends into the path of both latches 57 and 58. The switch operator is also formed with downwardly extending portion 82 located below the pivot 62. This portion of the switch operator serves to actuate the clutch operator 51 as will be described later.

The latch 57 (latch #1) is mounted on stud 57 and is biased in a clockwise direction by spring 59. One leg of this torsion spring bears against case stud 15 and the other end bears against a forwardly extending stud on latch 57. This latch has a latching portion which extends over the latching section 81 of the switch operator. The latch 57 thus serves to hold the switch operator from upward movement until this latch is released. The latch is also provided with a latch operating surface 83 which is in the path of the projection 67 on the spring lever 63. It will be apparent that upward movement of the spring lever 63 will cause counterclockwise rotation of latch 57, which will eventually cause it to release the latching section 81 of the switch operator.

The latch 58 (latch #2) is also pivoted on the stud 56 and to the rear of latch 57. This latch is biased in a clockwise direction as seen in FIGURE 2 by the torsion-type spring 60, one leg of which bears against the case stud 15, the other leg bearing against a projection 84 forming part of the latch. This latch 58 is formed with a latching surface 85 which extends beneath the latching section 81 of the switch operator. It will be apparent that this latch serves to hold the switch operator 64 in the raised position as shown in FIGURE 2. This latch 58 is also provided with two operating surfaces by which the latch may be actuated to released position. Surface A is located on the left side of the pivot 56. Downward pressure applied to surface A will cause releasing of the latch. Surface C is on the right side of the pivot 56 as seen in FIGURE 2. Upward pressure applied to this operating surface will cause release of the latch.

As shown in FIGURE 5, a torsion spring 86 is located between the spring lever 63 and the switch operator 64. This spring 86 is carried on the bearings supporting these members. One leg of the torsion spring 86 bears against an eyelet 87 on the spring lever. The other end of this spring 86 bears against an eyelet 88 carried by switch operator 64. As shown in FIGURE 1, one end of the torsion spring 86 bears against the top of eyelet 87 in the spring lever 63, and as shown in FIGURE 2, the other end of this same spring bears against the bottom of the eyelet 88 in switch operator 64. The spring 86 thus biases the switch operator 64 in a clockwise direction relative to the spring lever 63. If no other restraint were on the switch operator the latching section 81 of the switch operator would bear against the stop surface 90 on the spring lever immediately above the latching section 81.

A second torsion spring 91 is located between the spring lever and the case front 10. This torsion spring biases the pring lever downward a seen in FIGURE 1. One leg of this torsion spring bears against the side of the case front 10 and the other leg bears against the opposite side of the eyelet 87 in the spring lever.

Referring now to FIGURE 6, this figure shows the arrangement of the gear train and clutch mechanism. The timer motor 14 drives a pinion 92 which drives the first gear 93 of the gear train. This gear is carried by pinion 94 which rotates on a shaft 95 extending between plates 10 and 11. The pinion 94 drives a gear 96 carried by the clutch pinion 97 which is pressed over the knurl 98 on clutch shaft 54. This clutch shaft 54 fits into a slot 99 in the front plate and into a circular hole 100 in the back plate. This clutch shaft is formed with a shoulder 101 at its front end for locating the shaft relative to the front plate 10. A spacer 102 is provided behind the pinion 97 for maintaining the shaft in proper position between the two plates. The clutch pinion 97 drives the clutch gear 103 which in turn drives pinion 104 which drives the timing gear 33. Suitable spacers 105 and 106 locate gears 93 and 103 in proper operating positions.

As shown in FIGURES 1 and 2, the arrangement of slot 99 in the case permits engagement of the clutch pinion 97 with the clutch gear 103 as shown in FIGURE 1. This same slot permits the clutch pinion 97 to be separated from the clutch gear 103 as shown in FIGURE 2. Control of this movement of the clutch pinion is achieved by the clutch operator 51. This clutch operator if unrestrained will rotate clockwise about its pivot 50 under the action of its biasing spring 52. This will push the clutch pinion into engagement with the gear as shown in FIGURE 1. In operation the clutch pinion is driven in a counterclockwise direction as seen in FIGURE 1 which rotates gear 103 clockwise. This in turn drives the timing gear 33 in a counterclockwise direction. It should be noted that the driving action of the clutch pinion 97 causes a reaction tending to pull this pinion to the left against the bottom of the slot. Thus the clutch formed by the clutch pinion 97 and the clutch gear 103 is self energizing.

The clutch operator 51 is provided with operating surfaces 1, 2 and 3. Operating surface 1 is contacted by a projection 107 of inertia member 108 carried by the shaft 62. This inertia member is freely movable and the projection 107 of this member extends between the downward extension 82 of the switch operator and clutch operating surface 1. Clutch operating surface 2 is located on the clutch operator to the right of the pivot 50. Upward pressure on this operating surface will rotate the clutch operator counterclockwise and thus release the clutch. Operating surface 3 of the clutch operator is located to the left of the pivot 50. Downward pressure on this operating surface will release the clutch.

Figure 3:
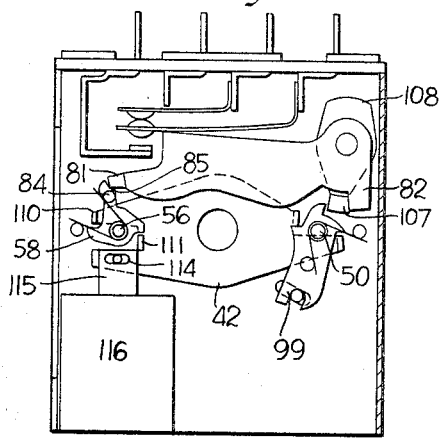
FIGURE 3 is a view similar to FIGURE 2 but in which parts have been omitted to illustrate more clearly the action of the solenoid lever on the latch and clutch operator.

The clutch operator 51 and the latch 58 are controlled by the solenoid lever 42 (FIGURE 3). As shown in FIGURE 5, this solenoid lever 42 is mounted on the main shaft 19 which serves as a pivot. This lever also extends to the rear of the latch and clutch operator and beyond the pivots of each. This solenoid lever may be provided with four different forwardly extending tabs, 110, 111, 112 and 113 (FIGURE 5). This solenoid lever is also provided with a slotted portion 114 below the latch 58 for connection to the plunger 115 of solenoid 116 which is located inside the timer housing. This solenoid lever 42 is biased in a clockwise direction about its pivot 19 by a tension spring 117 which is attached to a stud 118 carried by the front housing member 10.

In practice one or the other or both of tabs 110 and 111 would be omitted. These tabs may be omitted either by breaking off from a composite lever or by the manufacture of separate types of solenoid levers. Also in practice either the tab 112 or the upper portion of tab 113 would be omitted or both of these tabs may be omitted. Here again the tabs may be omitted by breaking off or by special manufacture of separate parts.

Tab 110 of solenoid lever if present will cause the latch 58 to release if the solenoid is energized. This provides timer characteristic A.

Tab 111, if used, will rotate the latch 58 to latching position when the solenoid is deenergized. This provides timer characteristic C.

The tab, 112 if used, will actuate the clutch member 51 to releasing position when the solenoid drops out. This provides timer characteristic 3.

Tab 113, if used, rotates the clutch operator 51 to clutch release position when the solenoid is energized. This provides timer characteristic 2.

OPERATION OF FIGURES 1 TO 4

FIGURE 1 shows the parts in the positions assumed during a time cycle. The spring lever 63 is at its lowermost point and its operating surface 67 is spaced from the operating surface 83 of latch 57 (latch #1). The latching portion of this latch is overhanging the latching section 81 of the switch operator. The switch operator now is at its lowermost position which allows the switch blade 71 to cause engagement of contacts 73 and 77. Contacts 73 and 74 are separated this time. Also the clutch operating portion 82 of the switch operator is at its left position which allows the clutch operator to assume its extreme clockwise position under the bias of spring 52. This urges the clutch pinion 97 into engagement with the clutch gear 103. The timer motor is normally energized with the clutch gear 103. The timer motor is normally energized through the contacts 73 and 77 and as these contacts are closed the timer motor will run, driving the gear 96 in a counterclockwise direction. This drives the clutch pinion 97 in the same direction causing the clutch gear 103 to rotate in a clockwise direction. This in turn drives the timing gear 33 in a counterclockwise direction causing the operating pin 34 to move away from the reset stop 32 toward the operating surface 66 of the spring lever 63. When the gear pin 34 reaches the operating surface 66 it begins rotating spring lever 63 clockwise about its pivot 62. This applies tension to the spring 86 which urges the switch operator 64 in a clockwise direction. However as soon as the clearance between the latching section 81 of this switch operator and the latch 57 is taken up, the switch operator stops moving. Continued counterclockwise rotation of the timing gear causes continued rotation of the spring lever and winding of the spring 86. During this time power from the timer motor is being stored in the spring 86 and the spring 86 is thus a power storing means. As the spring lever 63 continues to rotate, the operating portion 67 engages the latch operating surface 83 and starts rotation of latch 57 in a counterclockwise direction. At the predetermined switch operating point, latch 57 disengages the latching section 81 of the switch operator and the power stored in the spring 86 is released for driving the switch operator upwardly with rapid or snap action. This causes the switch blade 71 to be raised to the position shown in FIGURE 2 in which contacts 73 and 77 are disengaged and contacts 73 and 74 are engaged. During this rapid motion of the switch operator the operating section 107 of the inertia member 108 is struck by portion 82 of the switch operator. This in turn strikes the operating surface 1 of the clutch operator 51 causing the clutch operator to be rotated in a counterclockwise direction which separates the clutch pinion 97 from the clutch gear 103. The reset spring 36 (FIGURE 5) is now free to rotate the timing gear clockwise until the operating pin 34 of the timing gear strikes the reset stop 32. Due to the low inertia of the timing gear 33, the pinion 104 and gear 103, this reset motion takes place in a small fraction of a second and in fact is almost instantaneous. Just as soon as the reset movement of the timing gear starts, the pressure on portion 66 of the spring lever is released and this spring lever is free to return to the position shown in FIGURE 1.

If the latch 58 is unrestrained at the end of the time cycle by the solenoid lever, this latch will be free to move in under the latching section 81 of the switch operator 64. This latch will now hold the switch operator in the raised position which maintains contacts 73 and 74 engaged and also maintains the clutch gears disengaged.

If the latch 58 should be restrained from movement to latching position by the solenoid lever, then there is nothing to hold the switch operator in the raised position when the reset motion of the timing gear begins. The switch operator will now make a momentary engagement of contacts 73 and 74 and then drop to its lower position. This would allow instant reengagement of the clutch gears which would stop the reset motion except for the action of the inertia member 108. This member however was projected clockwise by the snap upward motion of the switch operator and its inertia serves to hold the clutch gears separated until the reset motion is completed.

Assuming that the solenoid lever was in position at the end of the cycle to allow the latch 58 to assume latching position, the parts will remain in the "timed out" positions shown in FIGURE 2 until the solenoid 116 is operated in a manner for releasing the latch. If the solenoid lever is of the type having tab 110, then energization of the solenoid will trip the latch and start a new time cycle. If the solenoid lever is of the type having tab 111, then deenergization of the solenoid will trip the latch and start a time cycle.

During the time cycle, the reset characteristics of the time depend upon the form at the right hand end of the solenoid lever. If it is desired that the timer reset when the solenoid drops out (characteristic 3) then the tab 112 is used. This will press downwardly on surface 3 of the clutch operator when the solenoid drops out and thus release the clutch.

If it is desired to have a reverse acting clutch (characteristic 2) then the extended tab 113 is used. This tab will engage the lower surface 2 of the clutch operator and thus release the clutch when the solenoid pulls in.

If it is desired to have a timer which is unaffected by operation of the solenoid during the time cycle, then both tabs 112 and 113 are omitted and the solenoid will control only the releasing of the latch 58.

If it is desired to have the time reset only under the control of the solenoid, then timer characteristic 1 (reset by switch operation) can be omitted simply by omitting the inertia member 108. In this case a spacer is provided on the shaft 62 instead of a complete inertia member.

The position of the reset stop 32 determines the starting position of the timing gear and hence the length of the time cycle. This reset stop 32 may be adjusted in position by pressing knob 30 which pushes the shaft 19 inwardly for disengaging the setting gear 26 from the stop 28. The shaft is now free to be turned to the desired timing period. When the pressure is released from knob 30, the spring 23 pushes the shaft forwardly for reengaging the setting gear 26 with the stop and holding the reset stop in its new adjusted position.

From the foregoing description it will be apparent that the invention provides a simple and compact automatic reset timing mechanism. The invention further provides a positive snap action of a heavy duty switching mechanism in both directions. And it will also be apparent that all of the power for operating the switch and releasing the clutch at the end of the time cycle comes from the timer motor. The only work done by the solenoid is to release the latch or to release the clutch during a time cycle. As a result the use of an extremely small solenoid is feasible which makes it possible to build the time small and compact.

It will also be apparent that the present invention provides a standard or basic mechanism which can be assembled to give a wide variety of models or timing characteristics. The three different modes of operating the clutch may be combined with the two different modes of operating the latch in many different combinations.

This makes it possible to supply exactly the right timer characteristics for a given application simply by installing the correct solenoid lever. The solenoid lever in effect is a key piece which may be installed just before the assembly of the timer is completed. This arrangement makes it possible to build the basic mechanisms in high volume and to supply specials for given applications at low cost.

FIGURES 8 TO 15

In the embodiment of the invention shown in FIGURE 1 both latches hold the switch operator 64. This arrangement involves a "race" between the inward motion of latch 58 and the reset motion of the timer. The latch 58 must be under the switch operator before it starts dropping, due to the release of the clutch mechanism. In order for this arrangement to operate satisfactorily the latch 58 must be perfectly free and its biasing spring 60 must be relatively strong.

In the arrangement shown in FIGURES 8 to 15 inclusive, latch #2 supports the spring lever instead of the switch operator. As the spring lever has already reached its topmost position before the switch operator is released, latch #2 can actually be in place before the clutch is released by motion of the switch operator.

Figure 14:
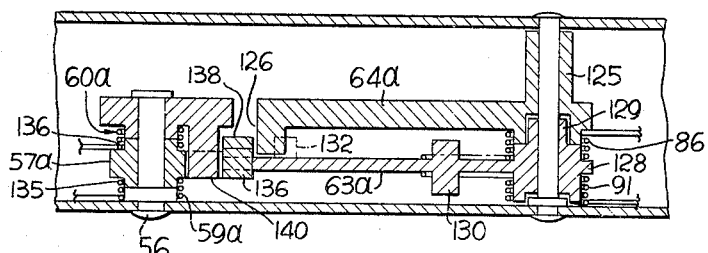
FIGURE 14 is a sectional view of the two latches, spring lever and switch operator.

In this embodiment of the invention, the switch operator 64A is molded with an integral bearing 125 (FIGURE 14). This switch operator is formed similarly to the switch operator 64 and is provided with a forwardly extending end portion 126 having a top latching surface 127. This portion is shown more clearly in exploded view 15. The spring lever 63a is also molded with its bearing 128, a portion of 129 of which extends into a recess formed in the switch operator 64a. As shown in FIGURE 14, both the switch operator 64a and the spring lever 63A are provided with hub portions which support the torsion spring 86. Also the spring lever is provided with a hub portion for supporting the torsion spring 91. Bosses 130 and 131 are molded into the spring lever and switch operator respectively for holding the ends of the torsion springs. The spring lever is also molded to include a rearwardly extending stop portion 132. This stop portion 132 is arranged to engage the rear portion of the latching surface 127 of the switch operator 64a. This arrangement serves to limit the relative motion between the spring lever and the switch operator and maintains the torsion spring 86a pretentioned.

In this embodiment of the invention, the inertia member 86 has been omitted and the downward extension 82a of the spring lever is widened so as to directly contact releasing surface 1 of the clutch operator 51. The inertia member may be used simply by narrowing the portion 82 of the clutch operator. If used, the inertia member fits directly over the exterior of the bearing portion 125 of the switch operator.

Figure 15:
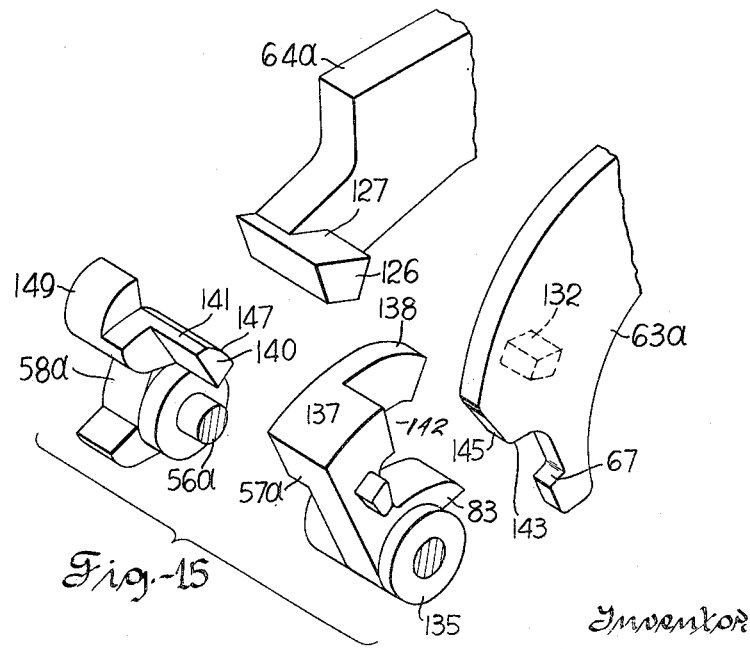
FIGURE 15 is an exploded view of the two latches and the ends of the spring lever and switch operator.

The latch 57a is molded and mounts on stud 56. This latch is provided with hub portions 135 and 136 for receiving torsion springs 59a and 60a. This latch 57a is formed with the operating portion 83 in alignment with the operating surface 67 of the spring lever 63a. This latch is also formed with a rearwardly extending portion 137 to which is molded the arcuate latching portion 138. As shown in FIGURES 14 and 15, the latching extension 138 extends to the rear of spring lever 63 and into the path of the latching surface 127 provided by the forward extension 126 of the switch operator 64a. From the description thus far, it will be apparent that the latch 57 serves to restrain the switch operator 64a from upward movement. This latch is moved to releasing position at the switch operating point by motion caused by surface 67 of the spring lever engaging the operating portion 83 of the latch.

As shown in FIGURES 14 and 15, the latch 58a is formed with a forwardly extending latch portion 140 having a latching surface 141 at its top. The projection 140 of the latch passes through the space 142 between sections 83 and 138 of latch member 57a. This portion 140 of the latch also extends under the spring lever 63a and the latching surface 141 is engageable with latching surface 143 formed on the spring lever 63a.

It will be apparent that in the arrangement described, main part of the latch member 58a is at the rear of the spring lever 63a. However the projection 140 extends forwardly so that this latch 58a controls movement of the spring lever. Also the switch operator 64a is located to the rear of the latch 57a. However due to the forward extension 126 on the switch operator and the rearward extension 137 on the latch 57a, this latch serves to control the upward movement of the switch operator.

FIGURE 8 shows the parts in the positions assumed when latch 58a is in the released position. At this time the stop 132 on the spring lever is in engagement with the top surface 127 of projection 126 on switch operator 64a. This neutralizes the action of the spring 86 and the spring 91 has moved both parts in unison to their lowermost positions. This motion is stopped by the latching surface 143 of the spring lever engaging the top of portion 83 of latch member 57a. The pressure of the switch operator surface 143 on the portion 83 of the latch provides a turning moment for rotating this latch clockwise into latching position. This turning moment is in addition to that provided by spring 59a. The latching portion 138 of latch 58a is now overlapped with the latching surface 127 of the switch operator 64a. At this time latch 58a has been forced to its extreme counterclockwise limit of rotation by pressure of the edge 145 of the spring lever on the curved surface 147 on latch member 58a.

As the end of the time cycle approaches, the operating pin 34 of the timing gear 33 (FIGURE 5) engages the operating portion 66 of the spring lever and rotates this spring lever counterclockwise about its pivot. The switch operator rotates with the spring lever until the clearance between latch portion 138 and the latching surface 127 is taken up. After that, continued rotation of the spring lever causes the stop lug 132 on the spring lever to separate from the projection 126 on the switch operator. Continued rotation of the spring lever by the timing gear stores power in the spring 86.

As the spring lever approaches the operating point, the latching surface 143 on the spring lever clears the latching surface 141 of latch member 58a. The biasing spring 60a now rotates the latch 58a clockwise, causing the latch surface 141 to come underneath the surface 143 as shown in FIGURE 10. After the latch 58a has come into place, the operating surface 67 of the switch operator engages portion 83 of latch 57a causing counterclockwise rotation of this latch bringing the edge of latching portion 137 to the edge of the latching surface 126 of the switch operator. At the operating point, the latch releases the switch operator and the biasing spring 86 forces the switch operator upwardly with snap action for operating the switch and also releasing the clutch as previously described. The timing gear now resets and removes the holding force on the spring lever. The spring lever now drops slightly until its latching surface 143 comes into engagement with the latching surface 141 of latch 58A. This position is shown in FIGURE 12. The switch will now be held in its upper position and the clutch will remain disengaged until the latch is released by the solenoid lever or other means.

FIGURES 16, 17 AND 18

In the embodiment of the invention shown in FIGURES 1 to 4 the solenoid lever is of the simple type which will maintain the latch disengaged unless the solenoid moves away from the starting position during the time cycle. For example if the solenoid lever is provided with tab 110, this lever will release the latch when the solenoid pulls in. If the solenoid is still energized at the end of the cycle, the latch will be prevented from returning and the timer will start a new cycle. This action may be termed "repeat" operation.

Figure 17:
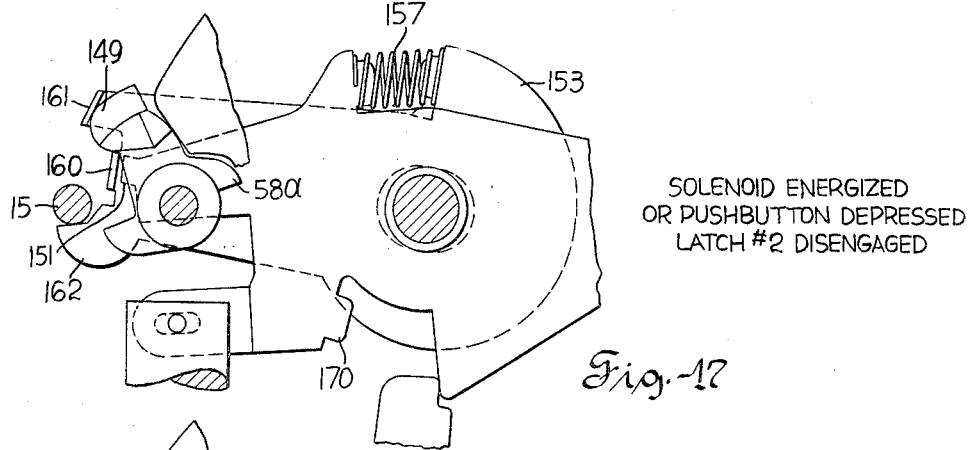
FIGURES 17 and 18 are fragmentary enlarged views showing other positions of the "nonrepeat" solenoid lever mechanism.
Figure 18:
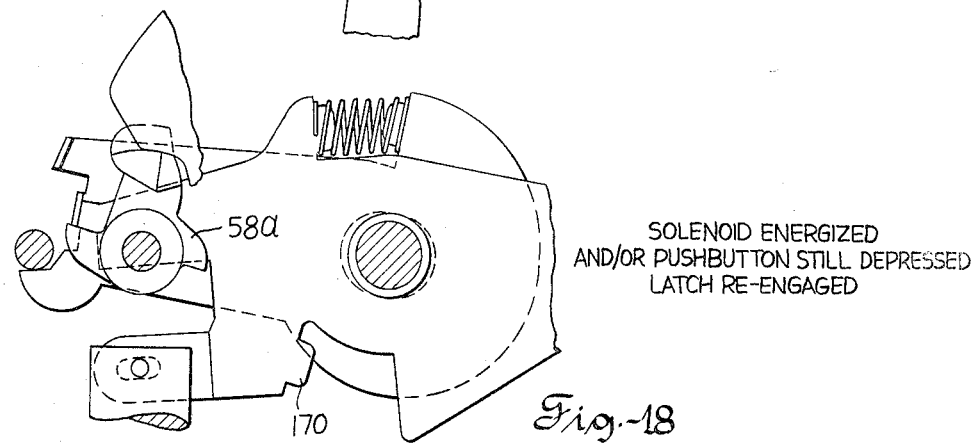

In some timer applications it is an advantage if the timer will give only one time cycle for each operation of the solenoid. In other words in some cases it is desirable to start the time cycle by energizing the solenoid and to have the timer go through its cycle and stop even though the solenoid is still energized at the end of the cycle. This sort of operation may be termed "nonrepeat" operation. FIGURES 16, 17 and 18 show a solenoid lever arrangement which will provide "nonrepeat" operation which is started by energizing the solenoid.

Figure 4:
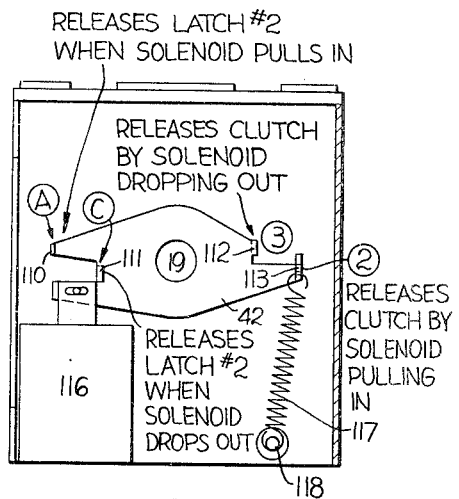
FIGURE 4 shows a composite solenoid lever and indicates the control effect of each portion of this composite lever.

Referring to FIGURE 16 the solenoid lever 150 is similar in construction to the solenoid lever of FIGURE 4 including optional tabs 112 and 113 for operation of the clutch. The other end of the solenoid lever is provided with a driver projection 151 having a lower operating surface 152. Located behind the solenoid lever 150 is the nonrepeat lever 153. This lever occupies the space between the solenoid lever and retainer 45 (FIGURE 5) and is the auxiliary lever 44 of that figure. This nonrepeat lever 153 fits loosely in this space so that the nonrepeat lever 153 is freely movable relative to the solenoid lever 150.

The nonrepeat lever 153 is provided with an elongated hole 154 which fits over the solenoid lever bearing 41. This elongated hole permits both lateral and rotary motion of the nonrepeat lever 153 relative to the solenoid lever 150. The solenoid lever is formed with a spring receiving portion 156 which is adapted to receive and retain a compression spring 157. This compression spring is also received by a spring retaining portion 158 formed in the nonrepeat lever 153. This spring 157 serves to bias the nonrepeat lever to the right causing the end of the elongated hole 154 to engage the solenoid lever bearing 41. This spring 157 also serves to bias the nonrepeat lever in a clockwise direction relative to the solenoid lever.

At its left hand end, the solenoid lever is provided with an inwardly extending tab 160 which is arranged to engage the left hand operating surface of the latch 58a. The nonrepeat lever is also provided with a second forwardly extending tab 161 which extends adjacent the rear circular portion 149 of the latch 58a. Nonrepeat lever 153 is also formed with an extension 162 which is adapted to engage the case stud 15 for limiting rotation of the nonrepeat lever 153 in the clockwise direction.

With the parts in the positions shown in FIGURE 16, the solenoid 116 is deenergized allowing the spring 117 to rotate the solenoid lever to its extreme clockwise limit of rotation. At this time the stop portion 162 of the nonrepeat lever 153 is against the case stud 15. The forwardly extending tab 160 on the solenoid lever 153 is in its uppermost position which has allowed the latch 58a to come into latching engagement with the spring lever 63a. At this time the switch operator 64a is in the position shown in FIGURE 12 causing the switch to be in the "timed out" position. Assuming the switch operator is of the type shown in FIGURE 12, the portion 82a of the switch operator will have moved the clutch operator 51 to its disengaged position.

When the solenoid is energized it will rock the solenoid lever 150 counterclockwise against the action of biasing spring 117. Initial counterclockwise movement of the solenoid lever will bring the lower surface 152 of the projection 151 into engagement with the top of the tab 160 of the nonrepeat lever 153. This will carry the nonrepeat lever 153 counterclockwise with the solenoid lever. The lower edge of tab 160 bears against the lefthand operating surface of the latch 58a and movement of the solenoid lever 153 will thus cause clockwise rotation of the latch 58a to releasing position.

Release of the spring lever by the latch occurs when the righthand edge of latching surface 141 reaches the end of the arcuate mating surface 143 of latch 63a. The spring lever 63a and the switch operator 64a now rotate as a unit as shown in FIGURE 8 under the effect of the biasing spring 91 (FIGURE 14). During this motion, the inclined end 145 of the spring lever 63 provides a camming action against the curved edge 147 of latch 58a. The action of biasing spring 91 thus serves to rotate the latch 58a in a counterclockwise direction. At this time the curved rear portion 149 of the latch 58A has engaged the forwardly extending tab 161 on the nonrepeat lever 153. This action pulls the nonrepeat lever to the left and this disengages the top surface of the tab 160 from the driving surface 152 of projection 151. The spring 157 is now free to rotate nonrepeat lever 153 clockwise, the parts now assuming the positions shown in FIGURE 17. It will be noted that the latch 58a has been cammed to its extreme counterclockwise position which has caused the operating portion 149 of the latch to engage the tab 161. This has pulled the solenoid lever to the left so that a space actually exists between the tab 160 and the driving portion 151 of the solenoid lever. The nonrepeat lever is now in its extreme clockwise limit of rotation and its stop portion 162 is in engagement with the case stud 15. The tab 160 is now in its upper position and thus will not interfere with the latch 58a coming back into latching engagement.

When the timer times out, the parts now operate as described in connection with FIGURES 8 to 12 and the latch 58a comes back into latching engagement just as if the solenoid had been deenergized. This relationship is shown in FIGURE 18. In order to start a new timing cycle it is necessary first to deenergize the solenoid and then energize it. When the solenoid is deenergized the solenoid lever is rotated back to the position shown in FIGURE 16 by the biasing spring 117. During the initial portion of this motion, the nonrepeat lever 153 remains stationary due to the stop portion 162 being in contact with stud 15. When the solenoid lever moves sufficiently to cause the bottom edge 152 of projection 151 to clear tab 160, the spring 157 pushes the nonrepeat lever to the right causing the tab 160 to come back in place under the driving surface 152. The nonrepeat lever 153 is thus once again cocked to provide a latch releasing action the next time the solenoid is energized.

From the foregoing description it will be apparent that when the solenoid is energized, the nonrepeat lever is locked to and moves with the solenoid lever until the latch is released. This latch when released is driven forwardly by the action of the spring lever dropping. This additional forward motion of the latch pulls the nonrepeat lever from disengagement with the solenoid lever so that the nonrepeat lever is now free to return to its initial position even though the solenoid lever remains in solenoid energized position.

It will be apparent that this nonrepeat solenoid tripping mechanism can be used with all of the arrangements described for clutch operation. If the solenoid lever is provided with tab 112 it will provide for resetting when the solenoid drops out. If both tabs 112 and 113 are omitted, the timer will not reset from action of the solenoid, and will provide one timed cycle regardless of the position of the solenoid during the cycle.

FIGURES 19, 20 AND 21

Figure 19:
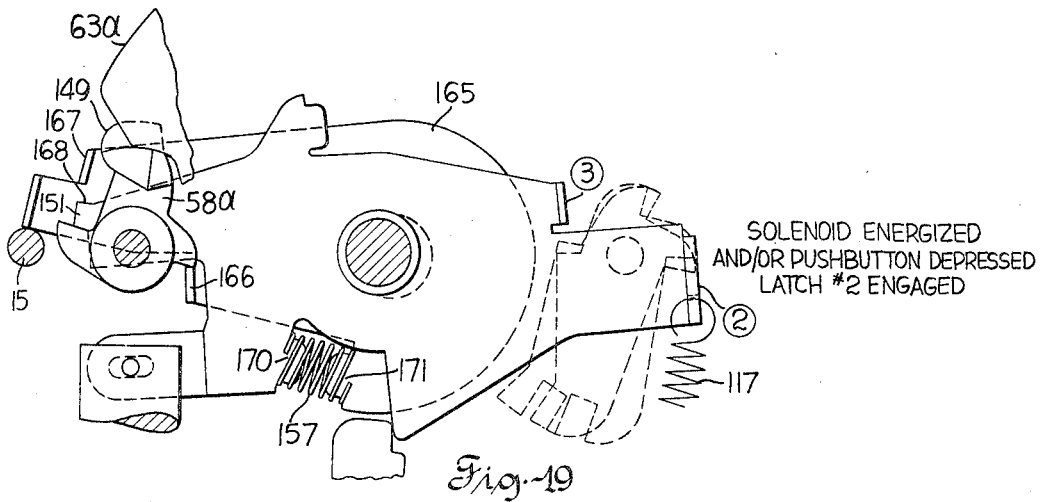
FIGURES 19, 20 and 21 are fragmentary views showing a reverse acting "nonrepeat" solenoid lever mechanism in different positions assumed during operation.
Figure 20:
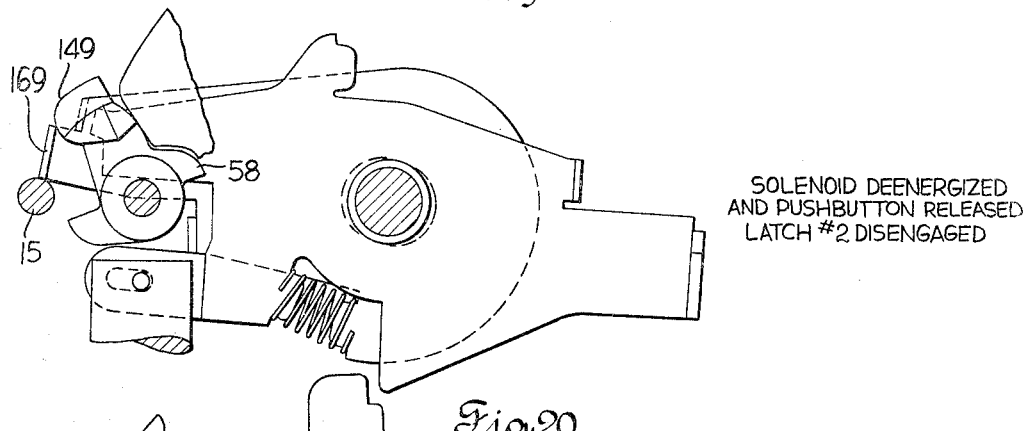
Figure 21:
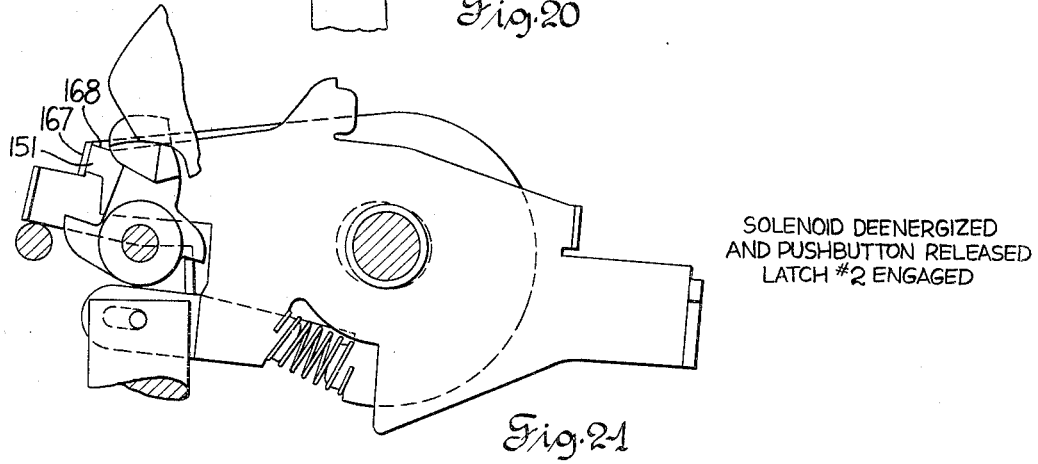

FIGURES 19, 20 and 21 show the application of the nonrepeat principle to an arrangement in which the latch is tripped when the solenoid drops out. The solenoid lever and other mechanism are exactly as shown in FIGURE 16. The only change is in the use of a different type of nonrepeat lever.

In this construction the nonrepeat lever 165 is provided with a tab 166 which is engageable with the righthand operating surface of latch member 58a. The nonrepeat lever is also provided with a short forwardly extending tab 167 which is adapted to be engaged by the upper operating surface 168 of projection 151 of the solenoid lever 150. The nonrepeat lever 165 is also provided with a forwardly extending tab 169 (FIGURE 20) which is engageable by the curved rear surface 149 of the latch member 58a. This portion of the nonrepeat lever also is arranged to strike the case stud 15 which serves to limit counterclockwise rotation of the nonrepeat lever 165.

In this construction the spring 157 is located on the lower spring support 170 of the solenoid lever and fits over a spring supporting portion 171 of the nonrepeat lever. The spring thus serves to bias the nonrepeat lever 165 in a counterclockwise direction and also urges this nonrepeat lever to the right as seen in FIGURE 19.

FIGURE 19 shows the parts in the positions assumed when the timer is "timed out" and the solenoid is energized. At this time the spring lever 63a is supported by the latch 58a. Also the tab 167 of the spring lever 165 is in the path of the operating surface 168 of the solenoid lever.

When the solenoid is deenergized, the spring 117 rocks the solenoid lever in a clockwise direction. The operating surface 168 comes into engagement with the tab 167 on the nonrepeat lever 165 causing this nonrepeat lever to now rotate with the solenoid lever. The tab 166 on lever 165 now raises the righthand operating surface of the latch 58a causing this latch to move to releasing position. When the latch is released, the tab 169 on the nonrepeat lever is in the path of the curved rear portion 149 of the latch 58a. Once the latch releases the spring lever 63a, the spring lever drops and cams the latch 58a an additional distance in the counterclockwise direction.

At this time portion 149 of the latch is engaging tab 169 of the nonrepeat lever, this causing the nonrepeat lever to be pulled to the left until the tab 167 is pulled clear of the operating surface 168. The spring 157 now is free to rotate the nonrepeat lever 165 counterclockwise back against the stop 15. At this time the tab 166 is clear of the righthand operating surface of the latch 58a so this latch is free to come back into latching position when the timer times out. When this occurs the parts assume the positions shown in FIGURE 21.

In order to start a new time cycle after the timer times out, it is first necessary to energize the solenoid and then deenergize it. When the solenoid is energized following the completion of a time cycle it rotates the solenoid lever 150 counterclockwise. The nonrepeat lever 165 at this time is held stationary due to its engaging the stop 15. This relative motion of the two parts causes the projection 151 of the solenoid lever to move downwardly. When the operating surfaces 168 of this projection clears tab 167, the spring 157 is free to push the nonrepeat lever to the right so that projection 167 comes back into the path of operating surface 168, as shown in FIGURE 19.

From the foregoing it will be apparent that this embodiment of the invention causes the latch to be tripped when the solenoid drops out. When the latch releases it is cammed forwardly by the spring lever 63 which motion causes the nonrepeat lever to be released from the solenoid lever so that it is free to return to inactive position. The latch therefore can return to latching position when the timer times out even though the solenoid still remains deenergized. In order to start a new time cycle it is first necessary to energize the solenoid which cocks the mechanism. Then deenergization of the solenoid will start a new cycle.

This embodiment of the invention utilizing the nonrepeat latch operation on solenoid deenergization may be used with any of the three clutch operating options. If it is desired to have the timer reset when the solenoid is deenergized, then tab 113 is used on the solenoid lever. If it is desired to reset the timer by energizing the solenoid then tab 112 is used. If no resetting during the cycle is desired both tabs are omitted.

PUSH BUTTON OPERATION

In addition to operating the lever 150 by the solenoid 116, this lever may also be operated by pressing a push button 180 which extends through the case front of the timer below the main shaft 19. This push button as will be explained serves to rotate a push button lever 181 in a clockwise direction. This lever is arranged to engage a downward extension 182 of the lever 150. Thus pushing of the push button causes rotation of lever 150 in the same direction as if the solenoid had been energized.

The push button 180 is of circular cross section and extends into the cylindrical portion 183 of the push button lever 184. The push button shaft is reduced at 185 to make room for a return spring 186 which bears against the bottom of the opening in the push button lever and the shoulder of the push button 180. The back end of the push button lever is reduced and fits into an opening 187 in the rear case member 11. The cylindrical portion 183 of the push button lever extends substantially to the case front 10 of the timer and encompasses a substantial portion of the push button for maintaining the push button in alignment with the push button lever. The push button lever thus has bearings providing for rotary motion. The rear bearing is the portion extending into opening 187 in the case back. The front bearing consists of the push button itself which is supported by the case front 10.

The push button 180 is formed with a laterally extending projection 189. This extension has one surface arranged to engage a stationary pin 190 which is mounted on the case front 10. The purpose of this pin is to prevent the push button from rotating when the push button is pushed. The cylindrical portion 183 of the push button lever is formed with an opening 191 through which the projection 189 extends. The push button lever 183 is also provided with a laterally extending projection 192 having a camming surface 193.

It will be apparent that when the push button 180 is pushed the curved front surface of projection 189 will engage the camming surface 193 of the push button lever. As the push button is restrained from rotation by the pin 190, this inward movement of the push button will act against the camming surface 193 to cause rotation of the push button lever in a clockwise direction. When the push button is released, the spring 186 will return the button to the outer position and the biasing spring 117 will return the lever 150 to its clockwise position.

From the foregoing it will be apparent that the push button mechanism may be used along with the solenoid 116 as shown in FIGURE 16. Alternately the solenoid 116 may be omitted and the timer operated solely by the integral push button.

Figure 25:
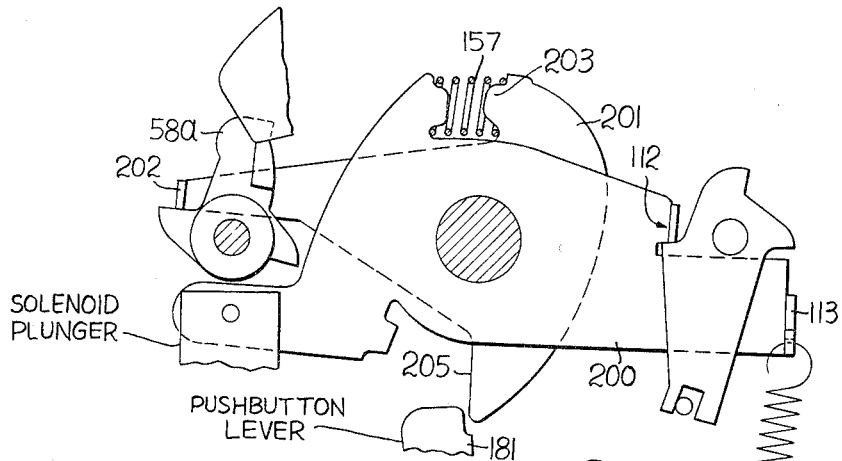
FIGURE 25 shows a modified lever construction in which the solenoid operates only the clutch mechanism and the push button operates only the latch mechanism.

In the embodiment of the invention shown in FIGURE 16 the push button lever 181 provides exactly the same effect as operating the solenoid. That is both of these controlled devices actuate the same lever 150. In some applications it is desirable to separate the functions of the two devices. FIGURE 25 shows one such arrangement. Here the solenoid lever 200 has no tabs for operating the latch 58A. It is also formed so that it has no portion 182 for actuation by the push button lever 181. This solenoid lever 200 may be provided with tab 112 or with the tab 113. That solenoid lever 200 is actuated only by the solenoid plunger and has no effect upon the operation of the latch 58A. If the lever 200 is provided with the tab 112, it will serve to release the clutch when the solenoid drops out. On the other hand if the solenoid lever is provided with the alternative tab 113, the lever would now release the clutch when the solenoid pulls in.

Located behind the solenoid lever in the same space provided for the nonrepeat levers is a push button lever 201. This push button lever carries an inwardly extending tab 202 which is arranged for engagement with the left hand operating surface of the latch 58A. The push button lever 202 is also provided with a spring retaining portion 203 for receiving the spring 157. The lever 201 is also provided with a downwardly extending portion 205 which is arranged for engagement with the push button lever 181. The spring 157 serves to bias the lever 201 clockwise for maintaining portion 205 in engagement with the push button lever 181. When the push button is released, the inturned tab 202 is in its raised position and permits the latch 58A to come into latching engagement. When the push button is depressed, the push button lever 181 will move to the right rocking the lever 201 counterclockwise against the action of spring 157, this causing the tab 202 to rotate the latch 58A to its released position which transfers the timer switch and starts the new time cycle.

From the foregoing it will be seen that the arrangement of FIGURE 25 provides for separation of the functions of the push button and the solenoid. In this case, the solenoid controls the clutch and is capable of causing the timer to reset at any portion of its cycle. However, if the timer once times out and the latch 58A comes into place, the solenoid no longer will have any function. Here it is necessary to manually reset the timer for another time cycle by pressing the push button.

Figure 26:
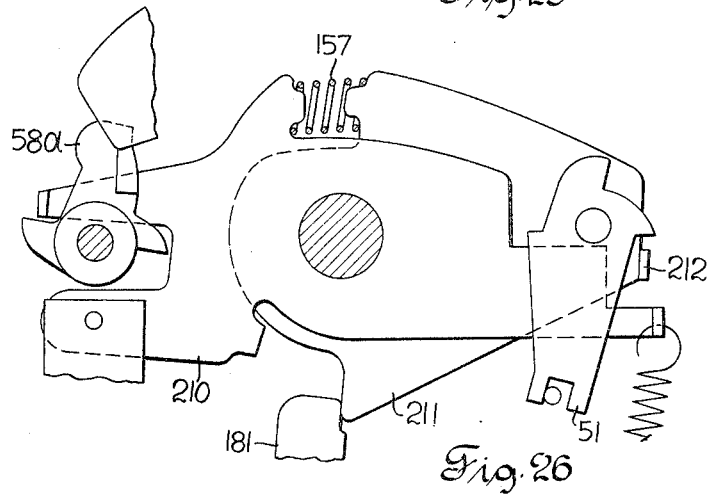
FIGURE 26 shows a solenoid and pushbutton lever construction on which the solenoid operates only the switch latch and the pushbutton operates only the clutch.

FIGURE 26 shows the reverse arrangement from FIGURE 25. In this figure, the solenoid lever 210 is provided with a tab for operating the latch 58A and has no tabs for actuating the clutch operator. The push button lever 211, however, is provided with tab 212 arranged for engagement with the right hand operating surface of the clutch operator 51. In the arrangement illustrated, the solenoid lever tab will trip the latch when the solenoid is energized. Of course, the reverse tab arrangement may be substituted in which the latch is released when the solenoid drops out.

The arrangement shown in FIGURE 26 allows for starting a time cycle remotely by operating the solenoid and for resetting the timer to the starting point at any time by the timer push button.

From the foregoing description it will be apparent that applicant's invention provides four separate options of clutch control. The clutch may be released to reset the timer by one or more of the following options:

(1) By timer at end of cycle.
(2) By energizing solenoid.
(3) By deenergizing solenoid.
(4) By pushing integral push button.

Applicant's invention also provides for seven different options of control of the timer switch. The timer switch may be transferred from "timed out" position to timing position by one or more of the following options:

(A) By solenoid energization (repeat).
(B) By solenoid energization (non-repeat).
(C) By solenoid deenergization (repeat).
(D) By solenoid deenergization (non-repeat).
(E) By pushing in or holding push button (repeat).
(F) By pushing button (non-repeat). (Button must be released after one cycle then pushed in to start new cycle.)
(G) By releasing push button (non-repeat). (Button must be pushed in and then released to start cycle.)

The above options of clutch and switch control provide many compatible combinations and thus offer a wide variety of timer charactertistics. This wide variety of timer characteristics is achieved by simple mechanical mechanism in the timer and requires no fancy circuitry for obtaining the desired characteristics. In addition, the selection of the desired timer characteristics involves only the solenoid lever assembly. The basic mechanism remains unchanged. Selection of the key assembly makes the timer perform for giving the results desired.

It is obvious that many different combinations can be made up using the four different options of clutch control and the seven different options of switch control.

Following is a description of a few of the possible combinations. FIGURES 27 to 37 inclusive in the drawing show schematic wiring diagrams for using the various models.

In the wiring diagrams the abbreviations included mean the following:

A—Timed load
B—"Timed Out" load
M—Timer motor
SOL—Solenoid
PS—Pilot Switch

The reference to the options of clutch control by numbers and reference to the options of switch controls by letters provides an easy method of identifying the timer characteristic. The models now referred to are identified by the options of control built into the timer.

MODEL 1

(1) Reset by switch operation at end of timed period. No latch #2 is used. No solenoid or solenoid lever.

Figure 27:
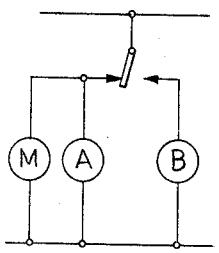

Wiring diagram FIGURE 27—repeat cycle operation

During timed period load A is energized and load B de-energized. At end of period switch shifts breaking A and making B. At same instant, timer resets, causing switch to return.

Gives momentary switch operation at adjustable intervals. Non-resettable during timed period.

MODEL 12

(1) Reset by switch operation at end of timed period.
(2) Reset by energizing solenoid. No latch #2 is used.

Figure 28:
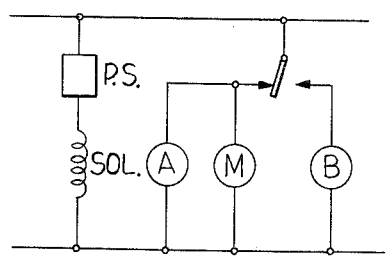

Wiring diagram FIGURE 28—repeat cycle operation

During timed period load A is energized and load B deenergized. At end of period switch shifts breaking A and making B. At same instant timer resets, causing switch to return.

Gives momentary switch operation at adjustable intervals.

Resets to starting point at any time by energizing solenoid.

MODEL 13

(1) Reset by switch operation at end of timed period.
(2) Reset by deenergizing solenoid. No latch #2 is used.

Wiring diagram FIGURE 28—repeat cycle operation

During timed period load A is energized and load B deenergized. At end of period switch shifts breaking A and making B. At same instant timer resets, causing switch to return.

Gives momentary switch operation at adjustable intervals.

Resets to starting point at any time by de-energizing solenoid.

MODEL 14

(1) Resets by switch operation.
(2) Reset by pushbutton. No latch #2 is used.

Wiring diagram FIGURE 27—repeat cycle operation

During timed period load A and the timer motor are energized while load B is de-energized. At end of period, the switch shifts breaking A and making B. At same instant the timer resets causing the switch to return.

Gives momentary switch operation at adjustable intervals. May be reset during time cycle by operating pushbutton.

MODEL 1A (1) Reset by switch operation at end of timed period.
(A) Latch #2 released by energizing solenoid (repeat).

Figure 29:
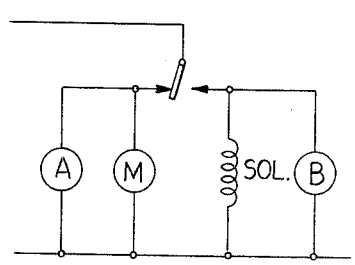

Diagram FIGURE 29 (repeat cycle timing)

During timed period load A is energized and load B de-energized.

At end of timing the switch shifts, breaking A, making B, and energizing the solenoid. Also the timer resets.

Energization of the solenoid releases latch #2, causing return of the switch, remaking A, breaking B and de-energizing the solenoid.

Gives momentary switch operation at adjustable intervals. Non-resettable during timed period.

Length of impulse is longer than Model 1 (diagram WD-1) as solenoid must actuate to terminate impulse.

Figure 30:
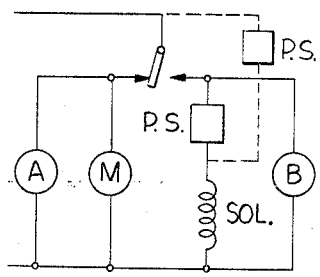

Diagram FIGURE 28 or FIGURE 30
(repeat cycle timing)

During timed period, load A is energized and load B de-energized.

At end of timing, switch shifts, breaking A, de-energizing timer motor and making B.

Maintaining pilot switch closed causes timer to give periodic impulses. his action may be stopped with load B energized by opening pilot switch. Diagram FIGURE 30 will provide longer impulses than FIGURE 28 as solenoid must pull at end of timed period before the latch releases.

Figure 35:
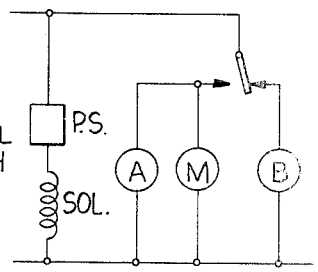

Diagram FIGURE 35 (interval timing)

In interval timing, load B is normally energized. Closure of pilot switch energizes the solenoid releasing latch #2, causing the switch to shift, breaking B and energizing load A and the timer motor. At the end of the timed period the switch shifts back to its normal position.

Closure of pilot switch releases latch to start a new cycle.

Non-resettable during cycle.

MODEL 14A (1) Reset by switch operation at end of cycle.
(4) Reset by pushbutton.
(A) Latch #2 is released by energizing solenoid (repeat).

This model is provided with separate pushbutton and solenoid levers.

It has same applications as Model 1A but includes provision for manual reset during time cycle.

MODEL 1B (1) Rest by switch operation at end of timed period.
(B) Latch released by energizing solenoid (non-repeat).

Diagram FIGURE 35—(interval timing)

Closure of pilot switch releases latch, breaking B, and energizing A and timer motor.

At end of timed period, switch de-energizes A and timer motor and makes B.

Pilot switch closure may be either momentary or sustained.

Non-resettable during cycle.

MODEL 1C (1) Reset by switch operation at end of timed period.
(C) Latch released by de-energizing solenoid (repeat).

Diagram FIGURE 35

Opening of pilot switch releases latch causing switch to shift, breaking load B, and energizing load A and the timer motor.

At end of timed period, if the pilot switch has reclosed, the timer switch returns to its original position and remains there until the solenoid circuit is again broken, either by reopening of the pilot switch or by a power failure.

If the pilot switch is still open at the end of the timed period, the latch remains released.

The timer switch immediately returns to the run position and a new cycle is started.

Non-resettable during time cycle.

Momentary opening of pilot circuit starts timing interval. Sustained opening of pilot circuit provides repeat cycle operation which can be terminated by closing pilot switch.

MODEL 1D (1) Reset by switch operation at end of timed period.
(D) Latch released by de-energizing solenoid (non-repeat).

Diagram FIGURE 35 (interval timing)

Opening of pilot switch releases latch causing switch to shift, breaking load B, and energizing load A and the timer motor.

At the end of the timed period, the switch returns to its original position and remains there regardless of whether the solenoid is energized or de-energized. To start a new cycle, the solenoid must first be energized and then de-energized.

Non-Resettable during time cycle.
Started by opening pilot circuit.
Opening of pilot circuit may be momentary or sustained.

MODELS 1C OR 1D

Figure 33:
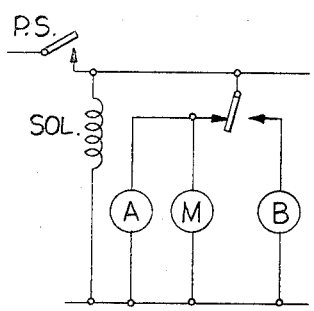

Wiring diagram FIGURE 33—(delay timing)

In starting position, the timer switch is closed to load A and the timer motor.

When the main switch is closed, load A and the timer motor are energized.

At end of delay period, the switch shifts, resetting the timer, de-energizing load A and the timer motor and energizing load B which remains energized as long as the main switch is closed.

When the main switch opens, the solenoid drops out and the timer switch returns to the starting position.

Non-Resettable during time cycle.
Started by closure of main circuit.

MODEL 14C (1) Reset by switch operation at end of timed period.
(4) Reset by pushbutton.
(C) Latch released by de-energizing solenoid (repeat).

This model is provided with separate pushbutton and solenoid levers.

It has same application as Model 1C but includes provision for manual reset during the time cycle.

MODEL 12A OR 12B (1) Reset by switch operation at end of timed period.
(2) Reset by solenoid energization.
(A or B) Release latch by energizing solenoid.

Diagram FIGURE 30—(repeat cycle timing).

During timed period load A is energized and load B de-energized. At end of timing the switch shifts, de-energizing A and the timer motor. If the pilot switch is closed, the solenoid is energized, releasing the latch and starting a new cycle. Opening of the pilot switch discontinues the repeat cycle timing with load B energized.

Diagram FIGURE 35—(interval timing).

Closure of pilot switch causes switch to shift, de-energizing load B and energizing the timer motor and load A. However, timing does not start until the solenoid is de-energized either by opening the pilot switch or another switch in the solenoid circuit.

When the solenoid drops out, the clutch engages and the timer operates for the set time, de-energizing load A, the timer motor, and energizing load B.

Timer switch is actuated by closing pilot circuit. Timing is started by re-opening pilot circuit. Resettable during cycle by closing pilot circuit.

MODEL 12D (1) Reset by switch operation at end of cycle.
(2) Reset by solenoid energization.
(D) Release latch by de-energizing solenoid (non-repeat).

Diagram FIGURE 35 (interval timing)

Opening of pilot circuit drops out solenoid actuating the timer switch to de-energize load B and energize load A and the timer motor. The clutch engages and the timer runs. At end of timing, the switch is actuated to de-energize load A and energize load B, and stop the timer motor. Also the timer resets.

Timer is started by opening of pilot circuit, either momentary or sustained.

To start a new cycle, the pilot circuit must be first closed and then opened.

Resettable during cycle by closing pilot circuit.

MODEL 12D

Figure 34:
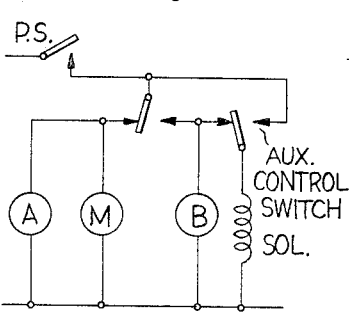

Wiring diagram FIGURE 34—delay timing

Closure of main switch energizes load A and the timer motor. With the auxiliary control switch in the position shown, the solenoid is de-energized allowing the clutch to engage.

The timer operates through the delay period and shifts its switch, de-energizing load A and the timer motor while energizing load B and the solenoid. The timer mechanism resets with the switch latched in this position.

When the main switch is opened, the solenoid drops out releasing the latch, causing the timer switch to return to the starting position.

Operation of the auxiliary switch during the cycle can energize the solenoid causing the timer to return to the starting point.

Delay period is started by closing main switch.

Will not reset by opening main switch or by power interruption.

Can be reset during delay period by closure of pilot circuit by auxiliary switch.

MODEL 13B (1) Reset by switch operation.
(3) Reset by de-energizing solenoid.
(B) Release latch by energizing solenoid (non-repeat).

Wiring diagram FIGURE 33—(delay timing)

When the main switch is closed, the solenoid is energized allowing the clutch to engage. Load A and the timer motor are energized. The timer runs through the time cycle and the switch shifts, energizing load B and de-energizing load A and the timer motor.

The timer mechanism resets, but the switch is held by the latch for maintaining the load B energized.

When the main switch is opened, load B is de-energized, but the timer switch is not actuated until the main switch is reclosed. When the main switch is again closed, load B is energized momentarily before the solenoid pulls in to release the latch, causing the timer switch to return to the starting position.

MODEL 13B

Wiring diagram FIGURE 35—(interval timing)

Closure of pilot switch trips the timer switch, de-energizing load B and energizing load A and the timer motor. Also closure of the pilot switch causes the clutch to engage. The timer runs through its cycle and returns the switch to initial position. To start a new cycle, the solenoid must first be dropped out and then pulled back in.

Can be reset by opening pilot switch.
Resets on power interruption.

MODEL 13B

Figure 36:
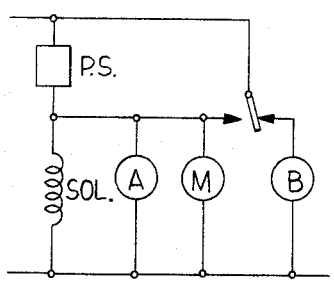

Wiring diagram FIGURE 36—interval timing

Closure of the pilot switch energizes load A, the timer motor, and the solenoid. The solenoid pulls in releasing the latch, causing the timer switch to operate, de-energizing load B and shunting the pilot switch which may now open.

At the end of cycle, the switch will shift back to energize load B and to disengage the clutch causing the timer to reset.

If the pilot switch is still closed at this time, load A, the timer motor and the solenoid remain energized. Thus both loads will be energized until the pilot switch is opened. The timer motor will run but the timer will not operate as the clutch is disengaged.

If the pilot switch is open at end of cycle, the timer switch shifting will de-energize load A, simultaneously with energizing load B.

Will reset during cycle by a power interruption to the solenoid.

MODEL 13C OR 13D (1) Reset by switch operation.
(3) Reset by de-energizing solenoid.
(C) Release latch by solenoid de-energization.
(D) Release latch by solenoid de-energization.

Figure 31:
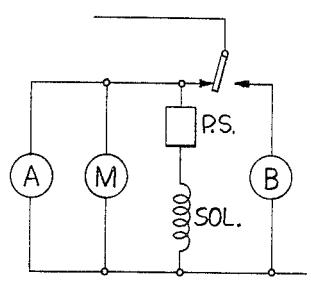

Wiring diagram FIGURE 31—repeat cycle impulse timer

With pilot switch closed, the solenoid is energized along with load A and the timer motor when the switch is in the released position. Energization of the solenoid allows the clutch to engage and the timer to run.

At the end of the timed period, the switch shifts to "latched" and the timer resets. Load B is energized while load A, the timer motor and solenoid are de-energized. Dropping out of the solenoid releases the latch, and the timer automatically starts a new cycle.

Resets by opening the pilot switch.
Resets by power interruption.
Opening of pilot switch suspends repeat cycle timing with switch in "released" position.

Figure 32:
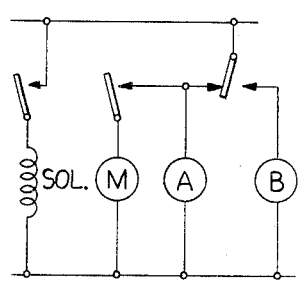

Wiring diagram FIGURE 32—delay timing

When the two pole pilot switch is open, the clutch is disengaged and the timer motor is de-energized. Load B is de-energized while load A is energized.

When the pilot switch is closed, the clutch engages and timing starts. At the end of the delay period, the switch shifts, de-energizing load A and the timer motor, and energizing load B. When the pilot switch opens, the latch is released causing the switch to return to its initial position.

Delay timing is started by closure of a pilot switch which does not carry the load.

Resets by opening of pilot switch.
Resets by power interruption.

Wiring diagram FIGURE 33—delay timing

Closure of the main switch completes a circuit to load A and the timer motor through the timer switch. It also energizes the solenoid allowing the clutch to engage. The timer runs through the delay period causing the timer switch to shift, energizing load B and de-energizing load A and the timer motor. Also the timer resets.

The switch remains in this position until the main switch is opened or a power interruption occurs, causing the solenoid to release the latch and return the switch to its initial position.

Delay timing is started by closure of main switch.
Resets by opening of pilot switch.
Resets by power interruption.

Wiring diagram FIGURE 35—interval timing

Opening of the pilot switch drops out the solenoid releasing the latch causing the switch to shift, de-energizing load B while energizing the timer motor and load A.

Timing does not start until the pilot switch is reclosed to energize the solenoid allowing the clutch to engage.

At the end of the cycle, the timer switch shifts, de-energizing the motor and load A while energizing load B.

Interval timing started by momentarily breaking a circuit.

Timing does not start until circuit is reclosed.
Resets by opening pilot circuit.
Resets by power interruption.

COMBINATION PUSHBUTTON AND SOLENOID CONTROLLED.—MODELS 13E–13F–13G (1) Reset at end of timed cycle.
(2) Reset by de-energizing solenoid.
(E, F or G) Switch tripped by timer pushbutton.

Figure 37:
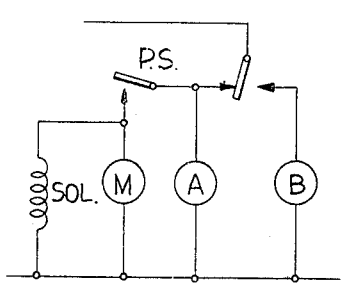

Wiring diagram FIGURE 37

The timer switch is normally unlatched, energizing load A and de-energizing load B. Each time the pilot switch closes, the clutch engages and the timer runs. If the pilot switch opens before the timer times out, the timer resets. If the timer should time out, load A is de-energized and load B energized. The timer will remain in this condition until the pushbutton is manually operated.

MODELS 12E–12F–12G (1) Reset by switch operation.
(2) Reset by energizing solenoid.
(E, F or G) Release latch by operating pushbutton.

Wiring diagram FIGURE 35

Operating pushbutton release latch, de-energizing load B and energizing load A and timer motor. At end of timed period the switch returns to initial position and timer resets.

The timing action may be overcontrolled by the pilot switch. If this is closed when the pushbutton is actuated, the switch is transferred but timing is delayed until the clutch is engaged by opening of pilot switch. Also the timer may be reset at any time during the cycle by closing the pilot switch.

PUSHBUTTON MODELS.—MODEL 1E (1) Resets by switch operation.
(E) Release latch by pressing pushbutton (repeat).

Wiring diagram FIGURE 27

Pushing button releases latch causing switch to de-energize load B and to energize load A and the timer motor.

The timer runs through its cycle, the switch shifts back to its original position and the timer resets.

Unless the pushbutton has been released before the end of the cycle, the latch will be in the released position and a new cycle will start when the timer resets.

MODEL 1F (1) Resets by switch operation.
(F) Release latch by pressing pushbutton (non-repeat).

Wiring diagram FIGURE 27

Pushing button releases latch causing switch to de-energize load B and to energize load A and the timer motor.

The timer runs through its cycle, the switch shifts back to its original position and the timer resets.

The non-repeat mechanism allows the latch to return to latching position at the end of the cycle regardless of whether the pushbutton is released or depressed.

In order to start a new timing cycle, the pushbutton must first be released and then depressed.

This model once started will give a single time cycle which is unaffected by manipulation of the pushbutton during the time cycle.

MODEL 1G (1) Resets by switch operation.
(G) Release latch on release of pushbutton (non-repeat).

Wiring diagram FIGURE 27

Pushing button releases latch causing switch to de-energize load B and to energize load A and the timer motor.

The timer runs through its cycle, the switch shifts back to its original position and the timer resets.

The non-repeat mechanism allows the latch to return to latching position at the end of the cycle regardless of whether the pushbutton is released or depressed.

In order to start a new timing cycle, the pushbutton must be first pressed in and then released.

This model once started will give a single time cycle which is unaffected by manipulation of the pushbutton during the time cycle.

MODEL 14G (1) Reset at end of cycle.
(4) Reset by pressing pushbutton.
(G) Release latch by first pressing and then releasing pushbutton.

Wiring diagram FIGURE 27

The operation is the same as Model 1G except the timer may be reset during the cycle by pressing the pushbutton.

From the foregoing description, it will be apparent that the present invention provides a small compact and accurate timing mechanism. It will also be apparent that the invention provides a basic mechanism providing an extremely wide range of different models, making it possible to supply the user with just the right timer that he needs for his application.

While I have shown and described a preferred form of the invention, it will be obvious that many modifications can be made with out departing from the spirit and scope of the invention.

I claim:

1. In an automatic reset control, a controller having a first position and a second position, a rotatable element, a reset stop arranged to limit rotary motion of said rotatable element, a reset spring arranged to bias said rotatable element toward the reset stop, means including a motor for driving said rotatable element and operating the controller from its first position to its second position in response to the rotatable element becoming separated a predetermined angular distance from the reset stop, said last mentioned means including release means enabling said reset spring to rotate the rotatable element to the reset stop to establish a starting point for a control cycle, power storing means arranged to receive power from the motor during said cycle, means for applying power from said power storing means to actuate the release means when the controller is operated from its first position to its second position, means for maintaining the controller in its second position, and pilot control means arranged to control said maintaining means for causing movement of the controller back to its first position.

2. In an automatic reset control, a controller having first and second positions, motor drive means, an oscillating control element, motion transmitting means connected to and actuated by the motor drive means and arranged to drive the oscillating control element in one direction, a reset spring associated with the oscillating control element and arranged to bias the same in the opposite direction, said motion transmitting means including a clutch which when engaged enables driving of the oscillating element against the bias of the reset spring and which when disengaged allows movement of the oscillating element by the reset spring, a reset stop arranged to limit movement of the oscillating element by the reset spring to establish a starting point of the oscillating element for a control cycle, power storing means arranged to receive power from the motor drive means during the said cycle, actuating means arranged to be actuated by release of power from the power storing means for actuating the controller from its first position to its second position and also disengaging the clutch, means actuated by the oscillating element when driven by the motor drive means to a predetermined position for releasing power from the power storing means to said actuating means and thus actuating the controller to its second position and disengaging the clutch, allowing the oscillating member to be returned by the reset spring to the reset stop, means for maintaining the controller in its second position, and pilot control means arranged to control said maintaining means for causing movement of the controller back to its first position.

3. A device as recited in claim 2 in which power from the motor is supplied to the power storing means by movement of the oscillating element.

4. A device as recited in claim 2 in which the means for maintaining the controller in its second position is a latch which is released by the pilot control means.

5. A device as recited in claim 2 in which the means for maintaining the controller in its second position also maintains the clutch disengaged.

6. In an automatic reset control, a controller having first and second positions, motor drive means, an oscillating control element, motion transmitting means connected to and actuated by the motor drive means and arranged to drive the oscillating element in one direction, a reset spring associated with the oscillating element and arranged to bias the same in the opposite direction, said motion transmitting means including a clutch which when engaged enables driving of the oscillating element against the bias of the spring and which when disengaged allows movement of the oscillating element by the reset spring, a reset stop arranged to limit movement of the oscillating element by the reset spring to establish a starting point of the oscillating element, means actuated by the oscillating element on reaching a predetermined distance from the starting point for causing the controller to shift from its first position to its second position, means including a first control member for controlling the return of the controller from its second position back to its first position, means including a clutch control member for disengaging said clutch, a master controller arranged to actuate at least the first control member, said control members being arranged with oppositely acting operating surfaces for actuation by the master controller so that different types of master controllers provide different control characteristics of the automatic reset timer.

7. A device as recited in claim 6 in which the master controller actuates both the first control member and the clutch control member.

8. In an automatic reset timer, a controller having first and second positions, motor drive means, an oscillating control element, motion transmitting means connected to and actuated by the motor drive means and arranged to drive the oscillating element in one direction, a reset spring connected to the oscillating element and arranged to bias the same in the opposite direction, said motion transmitting means including a clutch which when engaged enables driving of the oscillating element against the bias of the spring and which when disengaged allows movement of the oscillating element by the reset spring, a reset stop arranged to limit movement of the oscillating element by the reset spring to establish a starting point of the oscillating element, means actuated by the oscillating element on reaching a predetermined distance from the starting point for causing the controller to shift from its first position to its second position and for disengaging the clutch causing the oscillating element to reset, means including a control member for controlling the return of the controller from its second position back to its first position, a master controller arranged to actuate said control member, said control member having oppositely acting operating surfaces arranged to be contacted by the master controller so that different types of master controllers provide different characteristics of the automatic reset timer.

9. In an automatic reset control, a controller having first and second positions, a motor drive means, an oscillating control element, motion transmitting means connected to and actuated by the motor drive means and arranged to drive the oscillating element in one direction, a reset spring connected to the oscillating element and arranged to bias the same in the opposite direction, said motion transmitting means including a clutch which when engaged enables driving of the oscillating element against the bias of the spring and which when disengaged allows movement of the oscillating element by the reset spring, a reset stop arranged to limit movement of the oscillating element by the reset spring to establish a starting point of the oscillating element, means actuated by the oscillating element on reaching a predetermined distance from the starting point for causing the controller to shift from its first position to its second position and for disengaging the clutch causing the oscillating element to reset, means including a first control member for controlling the return of the controller from its second position back to its first position, means including a clutch control member for disengaging said clutch, a master controller arranged to actuate at least the first control member, said control members having oppositely acting operating surfaces for actuation by the master controller so that different types of master controllers provide different control characteristics of the automatic reset timer.

10. A device as recited in claim 9 in which the master controller actuates both the first control member and the clutch control member.

11. In an automatic reset control, a rotatable member having a bearing, a motor, drive means arranged to cause rotation of the rotatable member by power from the motor, said drive means including a controller for determining the direction of rotation of said rotatable member, said controller being pivoted on a stationary bearing spaced from and generally parallel with the bearing of the rotatable member, control means pivoted adjacent the rotatable member bearing and arranged to actuate said controller, and means for operating said control means.

12. In an automatic reset control, a rotatable member having a bearing, a motor, drive means arranged to cause rotation of the rotatable member by power from the motor, said drive means including a controller for determining the direction of rotation of said rotatable member, a control device, means actuated by said rotatable member for actuating said control device from a first position to a second position, an operator for the control device arranged to control return of said control device from its second position back to its first position, said operator being pivoted on a bearing spaced from and generally parallel with the bearing of the rotatable member, control means pivoted adjacent the rotatable member bearing and arranged to actuate said operator, and means for operating said control means.

13. In an automatic reset control, a rotatable member having a bearing, a motor, drive means arranged to cause rotation of the rotatable member by power from the motor, said drive means including a controller for determining the direction of rotation member, said controller being pivoted on a bearing spaced from and generally parallel with the bearing of the rotatable member, a control device, means actuated by the rotatable member for actuating said control device from a first position to a second position, an operator for the control return of the control device back to its first position, said operator being pivoted on a bearing spaced from and generally parallel with both of said bearings, a control lever means pivoted on the rotatable member bearing and arranged to actuate both the controller and the operator, and means for operating said control lever means.

14. In an automatic reset control, a main bearing member, a rotatable member mounted for rotation on said main bearing member, a motor, drive means including a clutch between the motor and rotatable member for enabling the motor to drive the rotatable member in one direction when the clutch is engaged, a reset spring arranged to drive the rotatable member in the opposite direction when the clutch is disengaged, a reset stop arranged to limit the travel of the rotatable member in said opposite direction, a controller for said clutch having an operating surface spaced from said main bearing member, means including a control lever pivoted on said main bearing member and having a portion arranged to engage and actuate the operating surface of the clutch controller and means for operating said control lever.

15. A device as set forth in claim 14 in which the clutch operator is pivoted on a stationary bearing spaced from and generally parallel with the main bearing member so that the clutch operator and control lever rotate in generally parallel relationship.

16. A device as set forth in claim 14 in which the main bearing member carries said reset stop and is rotatable for adjusting the position of said stop.

17. In an automatic reset control, a main shaft, a rotatable member operatively mounted on said shaft, a motor, drive means arranged to cause rotation of said rotatable member by power from said motor, means including a first controller for determining the direction of rotation of said rotatable member, a control device, means actuated by said rotatable member for actuating said control device from a first position to a second position, a second controller arranged to control return of the control device from its second position back to its first position, said second controller being pivoted on a bearing spaced from said main shaft, control means pivoted on said main shaft and arranged to actuate said second controller and means for operating said control means.

18. A device as set forth in claim 17 in which the main shaft is rotatable and carries adjusting means for determining the duration of the time cycle.

19. In an automatic reset timer, a subassembly consisting of a main shaft, a reset stop carried by said shaft, a timing gear mounted for rotation on the shaft and located rearwardly from the reset stop, a reset spring between the timing gear and reset stop and arranged to bias the timing gear toward the reset stop, and a control lever operatively mounted on the shaft at the rear of said timing gear.

20. In an automatic reset control, a main shaft, a rotatable member operatively mounted on said main shaft, a motor, drive means including a clutch between the motor and rotatable member for enabling the motor to drive the rotatable member in one direction when the clutch is engaged, a reset spring arranged to drive the rotatable member in the opposite direction when the clutch is disengaged, a reset stop arranged to limit travel of the rotatable member in said opposite direction, a first controller arranged to control the clutch and having an operating portion spaced from the main shaft, a control device means actuated by said rotatable member for actuating said control device from a first position to a second position, a second controller arranged to control return of the control device from its second position back to its first position, said second controller being pivoted on a bearing spaced from said shaft, a control means pivoted on said shaft and arranged to actuate both of said controllers, and means for operating said control means.

21. A device as set forth in claim 20 in which the shaft is rotatable and operatively carries said reset stop.

22. In an automatic reset control, a motor, an oscillating control member, drive means including a clutch between the motor and oscillating member for enabling the motor to drive the oscillating member in one direction when the clutch is engaged, a reset spring arranged to drive the oscillating member in the opposite direction when the clutch is disengaged, a control device, means actuated by motion of the oscillating member in said one direction for applying pressure to said control device tending to move the control device in one direction, a first latch for restraining motion of said control device in said one direction, means actuated when the oscillating member reaches a predetermined position for releasing said first latch, allowing motion of the control device to a second position, a second latch arranged to hold the control device in said second position, pilot control means for releasing said second latch, and means for releasing the clutch to allow the reset spring to drive the oscillating member in said opposite direction.

23. A device as set forth in claim 22 in which the control device releases the clutch on movement to the second position.

24. In an automatic reset control, a front plate, a back plate spaced from the front plate, a main shaft extending through the front plate and supported by the back plate, an adjusting member having a series of notches, said adjusting member being rigidly carried by said main shaft adjacent the front plate, a stop member on the front plate adjacent the adjusting member and arranged to engage notches in the adjusting member for holding the adjusting member in adjusted position, a spring biasing the main shaft forwardly for urging the adjusting member into engagement with the stop member, the parts being arranged so that pushing of the shaft inwardly releases the adjusting member from the stop, allowing rotary motion of the shaft and adjusting member to a new adjusted position, release of the shaft allowing the spring to return the shaft and adjusting member into engagement with said stop, a rotatable control member carried by said shaft, a reset spring for urging said control member in one direction, and a reset stop carried by the adjusting member arranged to stop movement of the control member by the spring at a predetermined angular position relative to the control member.

25. In an automatic reset control, an oscillating control element, a motor, drive means including a clutch between said motor and oscillating element, a pivoted clutch controller for releasing the clutch, a control device means actuated by the oscillating control element for actuating said control device from a first position to a second position, a pivoted lever for actuating said clutch controller, the pivot for the lever being spaced from the pivot of the clutch controller and the lever extending across the clutch controller pivot, said clutch controller having operating surfaces on both sides of its pivot adapted to be engaged by said lever, so that either a direct acting clutch or a reverse acting clutch may be obtained by arranging the lever to engage one or the other of said operating surfaces.

26. A device as defined in claim 25 in which the clutch controller has an additional operating surface engaged and actuated by the control device when it moves from its first position to its second position.

27. In an automatic control, a control device having a first position and a second position, means for actuating said control device from its first position to its second position, a pivoted latch arranged to hold the control device in said second position, a pivoted lever for actuating said latch, the pivot for the lever being spaced from the pivot of said latch and the lever extending across the latch pivot, the latch having operating surfaces on both sides of its pivot adapted to be engaged by said lever so that the latch may be released by movement of the lever in either direction, depending upon the arrangement of the lever.

28. In an automatic reset control, an oscillating control element, a motor, drive means including a clutch between said motor and oscillating element, a pivoted clutch controller for releasing the clutch, a control device means actuated by the oscillating control element for actuating said control device from a first position to a second position a pivoted latch arranged to hold the control device in its second position, a pivoted lever for actuating both the clutch controller and the latch, the pivot for the lever being spaced from the latch and clutch controller pivots and the lever extending across the same, said clutch controller having operating surfaces on both sides of its pivot adapted to be engaged by the lever so that either a direct acting clutch or a reverse acting clutch may be obtained by arranging the lever to engage one or the other of said operating surfaces, the latch having operating surfaces on both sides of its pivot adapted to be engaged by said lever so that the latch may be released by movement of the lever in either direction, depending upon the arrangement of the lever.

29. In an automatic reset control, a controller having first and second positions, motor drive means, an oscillating control element, motion transmitting means connected to and actuated by the motor drive means and arranged to drive the oscillating control element in one direction, a reset spring associated with the oscillating control element and arranged to bias the same in the opposite direction, said motion transmitting means including a clutch which when engaged enables driving of the oscillating element against the action of the reset spring and which when disengaged allows reset movement of the oscillating element by the reset spring, a reset stop arranged to limit movement of the oscillating element by the reset spring to establish a starting point for the oscillating element, said controller controlling the clutch means for causing said controller to move with snap action from its first position to its second position in response to the oscillating control element reaching a predetermined location, an inertia member operated in response to said snap action movement of the control device, said inertia member moving the clutch to released position and holding it released until the reset motion of the oscillating element has been completed.

30. In an automatic reset timer, a control element, a motor, means for causing oscillation of said control element, said means comprising drive means including a gear and a drive pinion therefore between the motor and said control element, said pinion being supported by two substantially spaced bearings, one of said bearings consisting of an elongated slot allowing disengagment of the pinion from the gear, and a pivoted clutch controlled arranged to separate the gear from the pinion.

31. A device as recited in claim 30 in which the clutch controller is arranged to selectively urge the pinion into engagement with the gear or to separate the pinion from the gear.

32. In an automatic control, a control device biased in one direction, means for moving said control device against its bias from a first position to a second position, a latch arranged to hold said control device in said second position, said latch and control device being constructed and arranged so that the latch is driven in releasing direction by movement of the control device after it has released the same, a controller for actuating the latch, said controller consisting of a primary member and a secondary member, the secondary member being actuated by the primary member and operating the latch said secondary member being releasable from the primary member, and means utilizing the driven motion of the latch after it has released the control device for releasing the secondary member from the primary member.

33. In an automatic reset control, an oscillating member, a motor, drive means arranged to cause oscillation of the oscillating member by power from the motor, said drive means including a controller for determining the direction of movement of said oscillating member, a control device means actuated by said oscillating member for actuating said control device from a first position to a second position, an operator for the control device arranged to control return of a said control device from its second position back to its first position, actuating means for actuating said operator in a manner to return the control device to its first position, said actuating means being constructed and arranged to release the operator after it has actuated the same so that the operator may return to its original position without corresponding return movement of the actuating means.

34. A device as recited in claim 33 in which the actuating means consists of a primary member and a secondary member, the secondary member being actuated by the primary member and actuating the operator, the secondary member being released from the primary member after it has actuated the operator.

35. In an automatic reset control, an oscillating member, a motor, drive means arranged to cause oscillation of the oscillating member by power from the motor, said drive means including a first controller for determining the direction of movement of the oscillating member, a control device arranged to be actuated from a first position to a second position by motion of the oscillating member by said motor, a second controller arranged to control return of said control device from its second position back to its first position, a solenoid arranged to actuate at least one of said controllers, and a pushbutton arranged to mechanically actuate at least the other of said controllers.

36. A device as recited in claim 35 in which both the solenoid and pushbutton are arranged for actuating both of said controllers.

37. A device as recited in claim 35 in which the solenoid actuates only the first controller and in which the pushbutton actuates only the second controller.

38. A device as recited in claim 35 in which the solenoid actuates only the second controller and in which the pushbutton actuates only the first controller.

39. In a control device, a movable control member biased in one direction, means for moving said control member against its bias from a first position to a second position, a latch arranged to hold said control member in said second position, means for releasing said latch, said control member and said latch having cooperating camming surfaces arranged to cause movement of the latch by movement of the movable member after the latch is released, and control means actuated by said movement of the latch caused by the control member.

40. In a control device, a first movable control member, biased in one direction, a second movable control member biased in the same direction as the first control member, said second control member being constructed and arranged to move the first control member against its bias from a first position to a second position when the second control member is moved from a corresponding first position to a second position, means for moving the second control member from its first position to its second position and thus causing corresponding movement of the first control member to its second position, a latch for holding at least one of said control members in its second position, said latch and said second control member having cooperating camming surfaces causing movement of the latch in releasing direction by the bias of the second control member.

41. In an automatic reset control, a motor, an oscillating control member, drive means including a clutch between the motor and oscillating member for enabling the motor to drive the oscillating member in one direction when the clutch is engaged, a reset spring arranged to drive the oscillating member in the opposite direction when the clutch is disengaged, control means operated by said oscillating member, said control means including a first control member and a second control member arranged for actuation by the first control member, means actuated by motion of the oscillating member in said one direction for applying pressure to the control means tending to move the control members in one direction, a first latch for restraining motion of the control means in said one direction, means actuated when the oscillating member reaches a predetermined position for releasing said first latch, allowing motion of the control means to a second position, a second latch arranged to hold the second control member of the control means in its second position, while allowing return movement of the first control member, pilot control means for releasing the second latch, and means for releasing the clutch to allow the reset spring to drive the oscillating member in said opposite direction.

References Cited
UNITED STATES PATENTS 3,225,151   12/1965   Lagasse _____ 200—38 X MILTON KAUFMAN, Primary Examiner U.S. Cl. X.R.

200—38, 39